United States Patent
Hamaguchi et al.

(10) Patent No.: US 12,476,463 B2
(45) Date of Patent: Nov. 18, 2025

(54) POWER SYSTEM ADJUSTING DEVICE AND POWER SYSTEM ADJUSTING PROGRAM

(71) Applicant: IHI Corporation, Tokyo (JP)

(72) Inventors: Kenichi Hamaguchi, Koto-ku (JP); Akinobu Inamura, Koto-ku (JP); Yuji Koguma, Koto-ku (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 18/707,996

(22) PCT Filed: Sep. 16, 2022

(86) PCT No.: PCT/JP2022/034811
§ 371 (c)(1),
(2) Date: May 7, 2024

(87) PCT Pub. No.: WO2023/157360
PCT Pub. Date: Aug. 24, 2023

(65) Prior Publication Data
US 2025/0260230 A1    Aug. 14, 2025

(30) Foreign Application Priority Data
Feb. 15, 2022  (JP) ................ 2022-021036

(51) Int. Cl.
H02J 3/32      (2006.01)
H02J 3/38      (2006.01)

(52) U.S. Cl.
CPC .............. *H02J 3/32* (2013.01); *H02J 3/381* (2013.01); *H02J 2300/24* (2020.01); *H02J 2300/28* (2020.01)

(58) Field of Classification Search
CPC ...... H02J 3/32; H02J 3/38; H02J 3/381; H02J 2300/28; H02J 2300/24
See application file for complete search history.

(56) References Cited

U.S. PATENT DOCUMENTS

2021/0305606 A1    9/2021    Murai et al.

FOREIGN PATENT DOCUMENTS

| JP | 2006-333563 A | 12/2006 |
| JP | 2013-034324 A | 2/2013 |

(Continued)

OTHER PUBLICATIONS

International Search Report mailed Nov. 29, 2022 in PCT/JP2022/034811 filed on Sep. 16, 2022, citing documents 19-22 therein, 2 pages.

(Continued)

*Primary Examiner* — Robert L Deberadinis
(74) *Attorney, Agent, or Firm* — Oblon, McClelland, Maier & Neustadt, L.L.P.

(57) ABSTRACT

An EMS includes a target presentation unit indicating target power, a power acquisition unit that obtains combined power obtained by adding power output from the photovoltaic power generation system, power consumed by the power consumer, power output from the power generation system, power consumed by the hydrogen production system, and power output or consumed by the storage battery system, and a command value generation unit that generates a command value such that the combined power asymptotically approaches the target power. The combined power includes a long- and intermediate-period component and a short-period component. The command value generation unit outputs a command value corresponding to the long- and intermediate-period component to the power generation system or the hydrogen production system. The command value generation unit outputs a command value corresponding to the short-period component to the storage battery system.

8 Claims, 13 Drawing Sheets

(56) References Cited

FOREIGN PATENT DOCUMENTS

| | | |
|---|---|---|
| JP | 2014-217198 A | 11/2014 |
| JP | 6208614 B2 | 10/2017 |
| JP | 2019-161845 A | 9/2019 |
| JP | 2020-54085 A | 4/2020 |
| JP | 2021-118574 A | 8/2021 |
| WO | WO 2020/121436 A1 | 6/2020 |

OTHER PUBLICATIONS

Toda et al., "Implementation of Carbon Neutral Strategy: Electrification, Hydrogen & Ammonia", Energy Forum, 2021, 3 pages (with partial English translation).

POWER SYSTEM ADJUSTING DEVICE AND POWER SYSTEM ADJUSTING PROGRAM

TECHNICAL FIELD

The present disclosure describes a power system adjusting device and a power system adjusting program.

BACKGROUND ART

In recent years, renewable energy has been widely used. Examples of the renewable energy include photovoltaic power generation and wind power generation. The renewable energy such as photovoltaic power generation and wind power generation is also referred to as variable renewable energy. It is known that when a power generation device that generates renewable energy is directly connected to a power system, the voltage and frequency of the power system are adversely affected depending on the scale of the power generation device. Under such circumstances, while the use of the renewable energy has been increased, concerns about the influence of the variability of renewable energy on the existing power network are also increasing.

For example, as a measure to reduce the influence of the variability of the renewable energy on the power network, attention has been focused on a technology for producing hydrogen using surplus power of the renewable energy (P2G). The P2G converts electric power obtained from renewable energy into hydrogen, which is gas body energy excellent in storage. That is, gas mainly composed of fossil fuel (city gas or the like) is converted into hydrogen.

Patent Literatures 1 to 4 disclose techniques related to a water electrolysis device and a power adjusting device using a storage battery. Paragraphs 0051 to 0053 and FIG. 2 of Patent Literature 1 disclose a system applied to equipment including a photovoltaic power generation facility. The system of Patent Literature 1 monitors and controls imbalance by combining a hydrogen production facility, a fuel cell, and a storage battery. The system of Patent Literature 2 controls the input power to the hydrogen production facility to match the set power supply and demand such as demand response. The control technique of Patent Literature 3 charges and discharges a storage battery so as not to deviate from a target range of power consumption amount. The control technique of Patent Literature 3 corrects the target range of the power consumption amount based on a difference between the current generated power amount of the photovoltaic power generation and the purchase plan value of the generated power. Patent Literature 4 discloses an energy management system. The energy management system of Patent Literature 4 monitors distribution power between a connection point between photovoltaic power generation and a water electrolysis device. Then, the energy management system of Patent Literature 4 creates a power consumption command value for water electrolysis based on a power threshold.

CITATION LIST

Patent Literature

Patent Literature 1: Japanese Unexamined Patent Publication No. 2020-54085
Patent Literature 2: WO 2020-121436 A
Patent Literature 3: Japanese Patent No. 6208614
Patent Literature 4: Japanese Unexamined Patent Publication No. 2021-118574

Non Patent Literature

Non Patent Literature 1: Naoki TODA, Takashi YATABE, and Bunro SHIOZAWA "Implementation of Carbon Neutral Strategy: Electrification, Hydrogen & Ammonia", Energy Forum, 2021.

SUMMARY OF INVENTION

Technical Problem

P2G systems may be adjacent to power plants such as photovoltaic power generation and wind power generation. The P2G system does not merely use surplus power of photovoltaic power generation or wind power generation. This is because the P2G system is required to convert energy into hydrogen by consuming electric power in the preceding stage of unstable electric power of renewable energy flows to the electric power system.

In such a case, the P2G system is required to perform an operation of consuming electric power based on unstable renewable energy and an operation of controlling electric power (receiving/transmitting power) at a connection portion with the electric power system. More specifically, the P2G system is required to have a power adjusting speed (immediate responsiveness) at which power based on unstable renewable energy can be immediately absorbed before flowing to the power system. In addition to the immediate responsiveness, the P2G system is also required to be sustainable to continue to regulate power.

The present disclosure describes a power system adjusting device and a power system adjusting program that can achieve both immediate responsiveness and sustainability.

Solution to Problem

One aspect of the present disclosure is a power system adjusting device. The power system includes a renewable energy power generation device that generates power using renewable energy; a power generation device that has a first responsiveness and is capable of adjusting power to be output and/or a demand device that is capable of adjusting power to be consumed; an energy storage device that has a second responsiveness equivalent to the first responsiveness or equal to or greater than the first responsiveness, stores received power, and outputs stored power; and a power consumer including equipment that consumes power output from the renewable energy power generation device, power output from the power generation device, and power output from the energy storage device. The power system adjusting device includes a target presentation unit configured to indicate target power, a power acquisition unit configured to obtain combined power obtained by adding power output from the renewable energy power generation device and power output from the power generation device and/or power consumed by the demand device, power output or consumed by the energy storage device, and power consumed by the power consumer, and a command value generation unit configured to generate a first command value and a second command value such that the combined power asymptotically approaches the target power. The combined power includes a long- and intermediate-period component including a first variation component and a short-period component including a second variation component belonging to a frequency band higher than the first variation component. The command value generation unit is configured to output the first command value corresponding to the long- and intermediate-period component to the power generation device and/or the demand device, and output the second command value corresponding to the short-period component to the energy storage device.

Advantageous Effects of Invention

According to the power system adjusting device and the power system adjusting program of the present disclosure, both immediate responsiveness and sustainability can be achieved.

BRIEF DESCRIPTION OF DRAWINGS

FIG. 6(*b*) is a graph illustrating power consumption of a hydrogen production system.

FIG. 7(*b*) is a graph illustrating the remaining amount of the storage battery system. FIG. 7(*c*) illustrates target values of receiving/transmitting power. FIG. 7(*d*) is a graph illustrating the receiving/transmitting power.

FIG. 8(*b*) is a graph illustrating set values of power consumption of power consumers.

FIG. 9(*b*) is a graph illustrating power consumption of the hydrogen production system. FIG. 9(*c*) is a graph illustrating generated power of the power generation system.

FIG. 10(*b*) is a graph illustrating the remaining amount of the storage battery system. FIG. 10(*c*) is a graph illustrating target values of the receiving/transmitting power. FIG. 10(*d*) is a graph illustrating the receiving/transmitting power.

DESCRIPTION OF EMBODIMENTS

Figure 1:
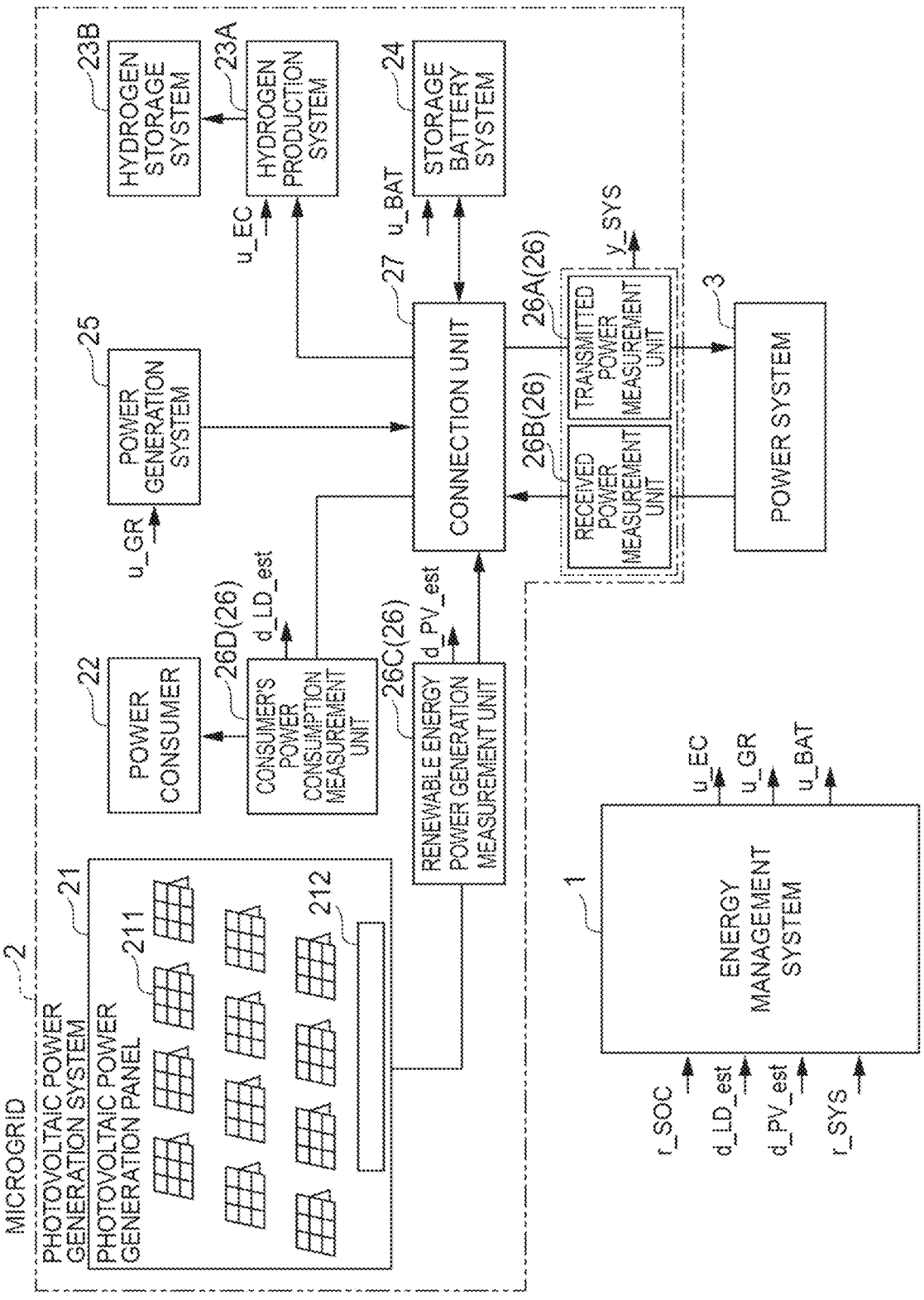
FIG. 1 is a diagram illustrating a power system to which an energy management system of the present disclosure is applied.

One aspect of the present disclosure is a power system adjusting device. The power system includes a renewable energy power generation device that generates power using renewable energy; a power generation device that has a first responsiveness and is capable of adjusting power to be output and/or a demand device that is capable of adjusting power to be consumed; an energy storage device that has a second responsiveness equivalent to the first responsiveness or equal to or greater than the first responsiveness, stores received power, and outputs stored power; and a power consumer including equipment that consumes power output from the renewable energy power generation device, power output from the power generation device, and power output from the energy storage device. The power system adjusting device includes a target presentation unit configured to indicate target power, a power acquisition unit configured to obtain combined power obtained by adding power output from the renewable energy power generation device and power output from the power generation device and/or power consumed by the demand device, power output or consumed by the energy storage device, and power consumed by the power consumer, and a command value generation unit configured to generate a first command value and a second command value such that the combined power asymptotically approaches the target power. The combined power includes a long- and intermediate-period component including a first variation component and a short-period component including a second variation component belonging to a frequency band higher than the first variation component. The command value generation unit is configured to output the first command value corresponding to the long- and intermediate-period component to the power generation device and/or the demand device, and output the second command value corresponding to the short-period component to the energy storage device.

Another aspect of the present disclosure is a power system adjusting program that causes a computer to execute adjusting the power system. The power system includes a renewable energy power generation device that generates power using renewable energy; a power generation device that has a first responsiveness and is capable of adjusting power to be output and/or a demand device that is capable of adjusting power to be consumed; an energy storage device that has a second responsiveness equivalent to the first responsiveness or equal to or greater than the first responsiveness, stores received power, and outputs stored power; and a power consumer including equipment that consumes power output from the renewable energy power generation device, power output from the power generation device, and power output from the energy storage device. The power system adjusting program includes indicating target power, obtaining combined power obtained by adding power output from the renewable energy power generation device and power output from the power generation device and/or power consumed by the demand device, power output or consumed by the energy storage device, and power consumed by the power consumer, and generating a first command value and a second command value such that the combined power asymptotically approaches the target power. The combined power includes a long- and intermediate-period component including a first variation component and a short-period component including a second variation component belonging to a frequency band higher than the first variation component. In generating the first command value and the second command value, a computer is caused to execute outputting the first command value corresponding to the long- and intermediate-period component to the power generation device and/or the demand device, and outputting the second command value corresponding to the short-period component to the energy storage device.

The power system adjusting device and the power system adjusting program described above cause the power generation device and/or the demand device to bear the long- and intermediate-period component including the first variation component for the combined power including power based on the renewable energy. According to this configuration, it is possible to obtain sustainability of continuously adjusting power. The power system adjusting device and the power system adjusting program cause the energy storage device to bear the short-period component including a second variation component belonging to the frequency band higher than the first variation component. According to this configuration, it is possible to obtain a power adjusting speed at which power based on unstable renewable energy can be immediately absorbed before flowing to the power system. That is, immediate responsiveness can be obtained. As a result, the power system adjusting device and the power system adjusting program described above can achieve both immediate responsiveness and sustainability.

The power acquisition unit included in the power system adjusting device according to one aspect may further acquire the power output from the renewable energy power generation device and the power consumed by the power consumers. The command value generation unit may generate the first command value corresponding to the long- and intermediate-period component by using the power output from the renewable energy power generation device, the power consumed by the power consumers, and the target power. The command value generation unit may generate the second command value corresponding to the short-period component using the combined power and the target power. According to this configuration, it is possible to generate the first command value that realizes sustainability required. It is possible to generate the second command value that realizes the power adjusting speed required.

The power acquisition unit included in the power system adjusting device according to one aspect may further acquire the power stored in the energy storage device. The target presentation unit may further indicate a target stored energy value which is a target value of the power stored in the energy storage device. The command value generation unit may generate the second command value such that the remaining amount of power stored in the energy storage device asymptotically approaches the target stored energy value. According to this configuration, the remaining amount of power stored in the energy storage device can be caused to asymptotically approach a desired amount.

The target presentation unit included in the power system adjusting device according to one aspect may further indicate a minimum target command value that is a minimum value of the first command value and/or a maximum target command value that is a maximum value of the first command value. The command value generation unit may output the minimum target command value as the first command value when the first command value is less than or equal to the minimum target command value. The command value generation unit may output the maximum target command value as the first command value when the first command value is equal to or greater than the maximum target command value. According to this configuration, it is possible to perform control in accordance with the operating conditions of the power generation device and/or the demand device.

The command value generation unit included in the power system adjusting device according to one aspect may output the minimum target command value or the maximum target command value to the demand device. The command value generation unit may output, to the power generation device, a complement command value for complementing power corresponding to a difference between the first command value and the minimum target command value or power corresponding to a difference between the first command value and the maximum target command value. According to this configuration, it is possible to perform control in accordance with the operating conditions of the power generation device and/or the demand device.

The command value generation unit included in the power system adjusting device according to one aspect may output the minimum target command value or the maximum target command value to the demand device. The command value generation unit may output, to the energy storage device, a complement command value for complementing power corresponding to a difference between the first command value and the minimum target command value or power corresponding to a difference between the first command value and the maximum target command value. According to this configuration, it is possible to perform control in accordance with the operating conditions of the power generation device and/or the demand device.

Still another aspect of the present disclosure is a power system adjusting device. The power system includes a renewable energy power generation device that generates power using renewable energy; a power generation device that has a first responsiveness and is capable of adjusting power to be output and/or a demand device that is capable of adjusting power to be consumed; an energy storage device that has a second responsiveness equivalent to the first responsiveness or equal to or greater than the first responsiveness, stores received power, and outputs stored power; and a power consumer including equipment that consumes power output from the renewable energy power generation device, power output from the power generation device, and power output from the energy storage device. The power system adjusting device includes a target presentation unit configured to indicate target power, a power acquisition unit configured to obtain power output from the renewable energy power generation device and power consumed by the power consumers, and a command value generation unit configured to generate a first command value and a second command value such that combined power asymptotically approaches the target power, the combined power being obtained by adding power output from the renewable energy power generation device, power output from the power generation device and/or power consumed by the demand device and power output or consumed by the energy storage device, and power consumed by the power consumer. The combined power includes a long- and intermediate-period component including a first variation component and a short-period component including a second variation component belonging to a frequency band higher than the first variation component. The command value generation unit generates the first command value corresponding to the long- and intermediate-period component by using the power output from the renewable energy power generation device, the power consumed by the power consumers, and the target power, and generates the second command value corresponding to the short-period component by using the combined power and the target power.

The power system adjusting device described above generates the first command value corresponding to the long- and intermediate-period component by using the power output from the renewable energy power generation device, the power consumed by the power consumers, and the target power. According to this configuration, it is possible to obtain sustainability of continuously adjusting power. The power system adjusting device described above generates the second command value corresponding to the short-period component using the combined power and the target power. According to this configuration, it is possible to obtain a power adjusting speed at which power based on unstable renewable energy can be immediately absorbed before flowing to the power system. That is, immediate responsiveness can be obtained. As a result, the power system adjusting device described above can achieve both immediate responsiveness and sustainability.

Hereinafter, modes for carrying out the present disclosure will be described in detail with reference to the accompanying drawings. In the description of the drawings, the same elements are denoted by the same reference numerals, and redundant description will be omitted.

FIG. 1 is an example of a power system to which an energy management system that is the power system adjusting device of the present disclosure is applied. The energy management system is hereinafter referred to as an EMS 1. The power system illustrated in FIG. 1 is also referred to as a microgrid 2. The microgrid 2 includes a photovoltaic power generation system 21, a power consumer 22, a hydrogen production system 23A (demand device), a hydrogen storage system 23B, a storage battery system 24, a power generation system 25, a transmitted power measurement unit 26A, and a received power measurement unit 26B. The microgrid 2 is connected to an external power system 3. The microgrid 2 can transmit power to the power system 3. The microgrid 2 can also receive power from the power system 3.

A photovoltaic power generation (PV) system 21, which is a renewable energy device, includes a solar panel 211 and a power conditioner 212 (PV-PCS). The power conditioner 212 converts DC power into AC power.

The renewable energy device included in the microgrid 2 to which the EMS 1 of the present disclosure is applied is not limited to the photovoltaic power generation system 21. For example, the renewable energy device may be a wind power generation system or a geothermal power generation system. The renewable energy device may be a biomass power generation system or a waste power generation system. The EMS 1 of the present disclosure is also applicable to the microgrid 2 including an energy system without a generator.

The EMS 1 of the present disclosure has an effect of suppressing disturbance factors with respect to the receiving/transmitting power. The disturbance element is a variation element of renewable energy. Therefore, the EMS 1 of the present disclosure can be suitably used for a renewable energy device whose output fluctuates. For example, in the photovoltaic power generation system 21, the power generation amount drastically fluctuates due to the influence of weather conditions such as solar radiation, temperature, and snowfall. For example, in the wind power generation system, the amount of power generation fluctuates due to the influence of the wind speed. In the biomass power generation system and the waste power generation system, the power generation amount fluctuates due to the influence of the property of the raw material. For example, the properties of waste such as biomass, waste, and sludge are generally unstable. In the biomass power generation system and the waste power generation system, output is not stable due to temporary mixing of an incineration inappropriate object or the like.

For the above reason, the EMS 1 of the present disclosure is also applicable to control of the microgrid 2 including the wind power generation system, the biomass power generation system, and the waste power generation system as the renewable energy device.

The power consumer 22 is a set of equipment that consume power. Examples of the equipment that consumes power include a server and a display constituting the EMS 1 that controls the microgrid 2. Examples of equipment that consumes electric power include air conditioning equipment. Examples of the equipment consuming electric power include auxiliary machines such as a hydrogen compressor, an air compressor, and a cooling tower constituting the hydrogen production system 23A and the hydrogen storage system 23B. Examples of the equipment that consumes electric power include a security device such as a lighting equipment or a monitoring camera in the facility. The power consumption of the power consumer 22 is the sum of the power consumed by such equipment.

The power consumer 22 may include low-voltage consumers including general households. The EMS 1 can monitor the power consumption of the power consumer 22. On the other hand, the EMS 1 cannot control the power consumption of the power consumer 22.

The hydrogen production system 23A produces hydrogen by water electrolysis. In general, water electrolysis methods include a polymer electrolyte membrane (PEM) type water electrolysis method and an alkaline water electrolysis method. The hydrogen production system 23A may be an apparatus employing the electrolyte membrane (PEM) type water electrolysis method. The hydrogen production system 23A may be an apparatus employing the alkaline water electrolysis method.

The hydrogen storage system 23B stores hydrogen produced by the hydrogen production system 23A. Hydrogen stored in the hydrogen storage system 23B is charged to a girdle or a hydrogen trailer by, for example, a hydrogen compressor. Thereafter, the charged hydrogen may be transported to a hydrogen demand site. The filled hydrogen may be supplied to a fuel cell vehicle (FCV) on site via a dispenser. The latter is called an on-site hydrogen station. The hydrogen storage system 23B may supply hydrogen to another hydrogen demand site through a pipeline. In any of the utilization forms, hydrogen exits from the microgrid 2 by transportation or the like. No further reference is made herein to hydrogen storage systems.

The microgrid 2 to which the EMS 1 of the present disclosure is applied may additionally include a power consumption device different from the hydrogen production system 23A and the hydrogen storage system 23B. The microgrid 2 to which the EMS 1 of the present disclosure is applied may include another power consumption device instead of the hydrogen production system 23A and the hydrogen storage system 23B. For example, the microgrid 2 may include an electric boiler instead of the hydrogen production system 23A. The microgrid 2 may include a steam accumulator instead of the hydrogen storage system 23B.

The storage battery system 24 includes a device capable of storing energy. The storage battery system 24 is an energy storage device. Examples of the device capable of storing energy include a secondary battery such as a lithium ion battery, a lead-acid battery, or a redox flow battery. Examples of the device capable of storing energy include a flywheel, a compressed air energy storage (CAES) facility, a high capacity capacitor, and the like. In general, the response speed of the storage battery system 24 is faster than the response speed of the water electrolysis device included in the hydrogen production system 23A. The response speed of the storage battery system 24 can be regarded as substantially the same as the response speed of a demand device such as an electric boiler. The response speed of the storage battery system 24 can be said to be equal to the response speed of a demand device such as an electric boiler. Note that "equal response speed" or "substantially the same responsiveness" does not require that values indicating the response speed or responsiveness strictly coincide with each other. The state in which the responsiveness of the demand device is equal to the responsiveness of the energy storage device may be defined as the state in which a value indicating the responsiveness of the demand device and a value indicating the responsiveness of the energy storage device exist in an allowable range that can be set based on various grounds. For example, the allowable range can be set based on a range that does not significantly affect the control executed by the EMS 1. The storage battery system 24 includes not only a storage battery but also a device that converts a direct current of the storage battery into an alternating current and a device that monitors a remaining capacity of the storage battery.

The power generation system 25 can control the generated power by receiving the command value (u_GR) issued from the EMS 1. The photovoltaic power generation system 21 cannot designate the generated power by the command value issued from the EMS 1. The power generation system 25 is different from the photovoltaic power generation system 21 described above in that the generated power can be designated by the EMS 1.

Examples of the power generation system 25 include a gas engine, a gas turbine, a diesel engine, and the like. When hydrogen generated in the microgrid 2 is referred to as so-called $CO_2$-free hydrogen, a power generation system using a non-fossil fuel is suitable for the power generation system 25. As a power generation system using a non-fossil fuel, for example, a fuel cell using $CO_2$-free hydrogen can be exemplified. In this case, hydrogen of the hydrogen storage system 23B may be used as fuel.

The microgrid 2 to which the EMS 1 of the present disclosure is applied does not include the power generation system 25 as an essential component. The EMS 1 of the present disclosure is also applicable to control of the microgrid 2 not including the power generation system 25. The microgrid 2 to which the EMS 1 of the present disclosure is applied can be applied to a configuration including a power consumption device and a storage battery. The microgrid 2 is also applicable to a configuration including a power generation device and a storage battery. The microgrid 2 is also applicable to a configuration including a power consumption device, a power generation device, and a storage battery.

A connection unit 27 distributes power to each system constituting the microgrid 2. The power distributed by the connection unit 27 may include the power received from the Power system 3 in addition to the power generated by the photovoltaic power generation system 21 and the like constituting the microgrid 2. The connection unit 27 is, for example, a distribution board.

The received power measurement unit 26B measures received power received from an external system (power system). The transmitted power measurement unit 26A measures transmitted power to be provided to an external system (power system). The renewable energy power measurement unit 26C measures power output from the photovoltaic power generation system 21 which is a renewable energy power generation system. The consumer's power consumption measurement unit 26D measures the power consumption by the power consumer 22. The received power measurement unit 26B, the transmitted power measurement unit 26A, the renewable energy power measurement unit 26C, and the consumer's power consumption measurement unit 26D are collectively referred to as a power measurement unit 26.

The EMS 1 sets the receiving/transmitting power as a controlled variable. Therefore, it is desirable that the sampling periods of the received power measurement unit 26B and the transmitted power measurement unit 26A be equal to the response speed of the storage battery system 24 or faster than the response speed of the storage battery system 24. For example, the sampling periods of the received power measurement unit 26B and the transmitted power measurement unit 26A are desirably in units of milliseconds. On the other hand, the sampling periods of the renewable energy power measurement unit 26C and the consumer's power consumption measurement unit 26D may be slower than the sampling periods of the received power measurement unit 26B and the transmitted power measurement unit 26A. The sampling cycle of the renewable energy power measurement unit 26C and the consumer's power consumption measurement unit 26D may be, for example, one second or more. The sampling period may be ten seconds or less. The power measured by the renewable energy power measurement unit 26C and the power measured by the consumer's power consumption measurement unit 26D are used for feedforward control of the hydrogen production system 23A and the power generation system 25 having a relatively slow response.

Figure 2:
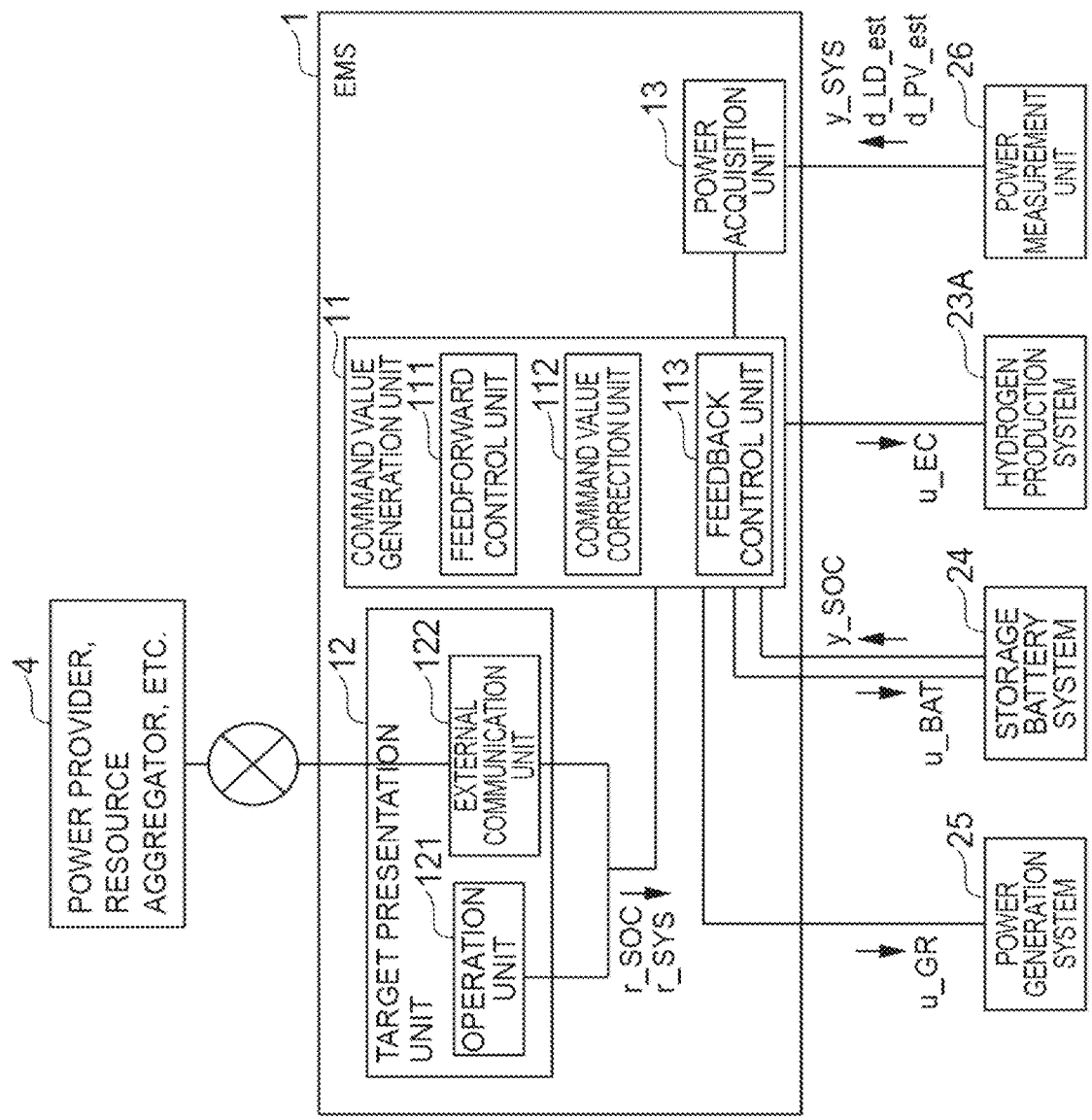
FIG. 2 is a functional configuration diagram of the energy management system of the present disclosure.

FIG. 2 is a functional configuration diagram of the EMS 1. FIG. 2 illustrates only the function related to the power control necessary for describing the function exhibited by functions of the EMS 1 of the present disclosure. Therefore, other functions exhibited by the EMS 1 are not illustrated. For example, the database function and the demand monitoring function, which are functions of the EMS 1, are not illustrated.

The EMS 1 includes a command value generation unit 11, an operation unit 121, and an external communication unit 122. The target value (r_SYS) of the receiving/transmitting power and the target value (r_SOC) of the remaining storage battery capacity used in the command value generation unit 11 are given from the higher system. For example, the target value is input from the operation unit 121 (monitor, keyboard, or the like) by a plant operator. The target value may be given from an external power provider or resource aggregator 4 via communication. Based on the given target value, the command value generation unit 11 outputs a command value to the power generation system 25, the storage battery system 24, and the hydrogen production system 23A. Various types of information necessary for plant control can be obtained from the storage battery system 24 or the power measurement unit 26.

The EMS 1 includes a command value generation unit 11, a target presentation unit 12, and a power acquisition unit 13. The target presentation unit 12 corresponds to the operation unit 121 and/or the external communication unit 122. The power acquisition unit 13 is connected to the power measurement unit 26. The power acquisition unit 13 obtains power information necessary for control from the power measurement unit 26. The acquisition of power information performed by the power acquisition unit 13 includes an operation of obtaining power itself. The acquisition of the power information performed by the power acquisition unit 13 includes an operation of obtaining information different from the power with which the power can be estimated and estimating the power from the different information. The acquisition of the power information performed by the power acquisition unit 13 includes an operation of acquiring a value obtained by calculation or estimation on the basis of indirect information for estimating power. The information obtained by the power acquisition unit 13 may be a measured value of power directly measured by the power measurement unit 26. The information obtained by the power acquisition unit 13 may be indirect information for estimating power. The information obtained by the power acquisition unit 13 may be a value obtained by calculation or estimation on the basis of indirect information for estimating power.

For example, the power acquisition unit 13 may obtain a measured value of power output from the renewable energy power generation device. The power acquisition unit 13 may obtain indirect information for estimating a value of power output from the renewable energy power generation device. The indirect information for estimating a value of power is, for example, sunlight hours. In this case, the power acquisition unit 13 may estimate the generated power output from the photovoltaic power generation system 21 using the information obtained from the solar radiation meter and the thermometer. The power acquisition unit 13 may obtain a value of power estimated from the indirect information for estimating a value of power output from the renewable energy power generation device. The power acquisition unit 13 may obtain the estimated value by performing a calculation for estimating the power by itself. The power acquisition unit 13 may perform calculation for estimating power with an element different from the power acquisition unit 13 and obtain a calculated value obtained by the calculation of the different element. The "power output from the renewable energy power generation device" described in the claims may include a measured value of power directly obtained by measurement, an estimated value of power obtained using indirect information for estimating a value of power, and a calculated value of power obtained using indirect information for calculating a value of power.

The power acquisition unit 13 may obtain a measured value of power consumed by the power consumer 22. The power acquisition unit 13 may obtain indirect information for estimating a value of power consumed by the power consumer 22. The power acquisition unit 13 may obtain a value of power estimated from the indirect information for estimating a value of power consumed by the power consumer 22. For example, when there are a plurality of power consumers 22, the total power consumed by the plurality of power consumers 22 may be measured by one power measurement unit. The power acquisition unit 13 may obtain the one total power. For example, when there are a plurality of power consumers 22, the individual power consumed by each of the plurality of power consumers 22 may be measured by a plurality of power measurement units. The power acquisition unit 13 may obtain the total power consumed by the plurality of power consumers 22 by acquiring a plurality of amounts of individual power and performing a calculation of adding them. The operation of acquiring the plurality of amounts of individual power and adding them together to obtain the total power may be executed by an element different from the power acquisition unit 13, and the power acquisition unit 13 may obtain the calculation result. The "power consumed by the demand device" described in the claims may include a measured value of power directly obtained by measurement, an estimated value of power obtained using indirect information for estimating a value of power, and a calculated value of power obtained using indirect information for calculating a value of power.

To summarize, the power acquisition unit 13 may obtain the estimated value by performing a calculation for estimating the power by itself. The power acquisition unit 13 may obtain a calculated value obtained by calculation for estimating power executed in an element different from the power acquisition unit 13 and then calculated by the calculation of the different element.

The command value generation unit 11 generates several command values to be provided to the hydrogen production system 23A, the power generation system 25, and the storage battery system 24. The command value generation unit 11 includes a feedforward control unit 111, a command value correction unit 112, and a feedback control unit 113. The feedforward control unit 111 generates a command value (u_EC) to be provided to the hydrogen production system 23A and a command value (u_GR) to be provided to the power generation system 25. The command value correction unit 112 corrects the load command value (v_FF) in consideration of the state of the storage battery system 24. The feedback control unit 113 generates a command value (u_BAT) to be provided to the storage battery system 24.

Figure 3:
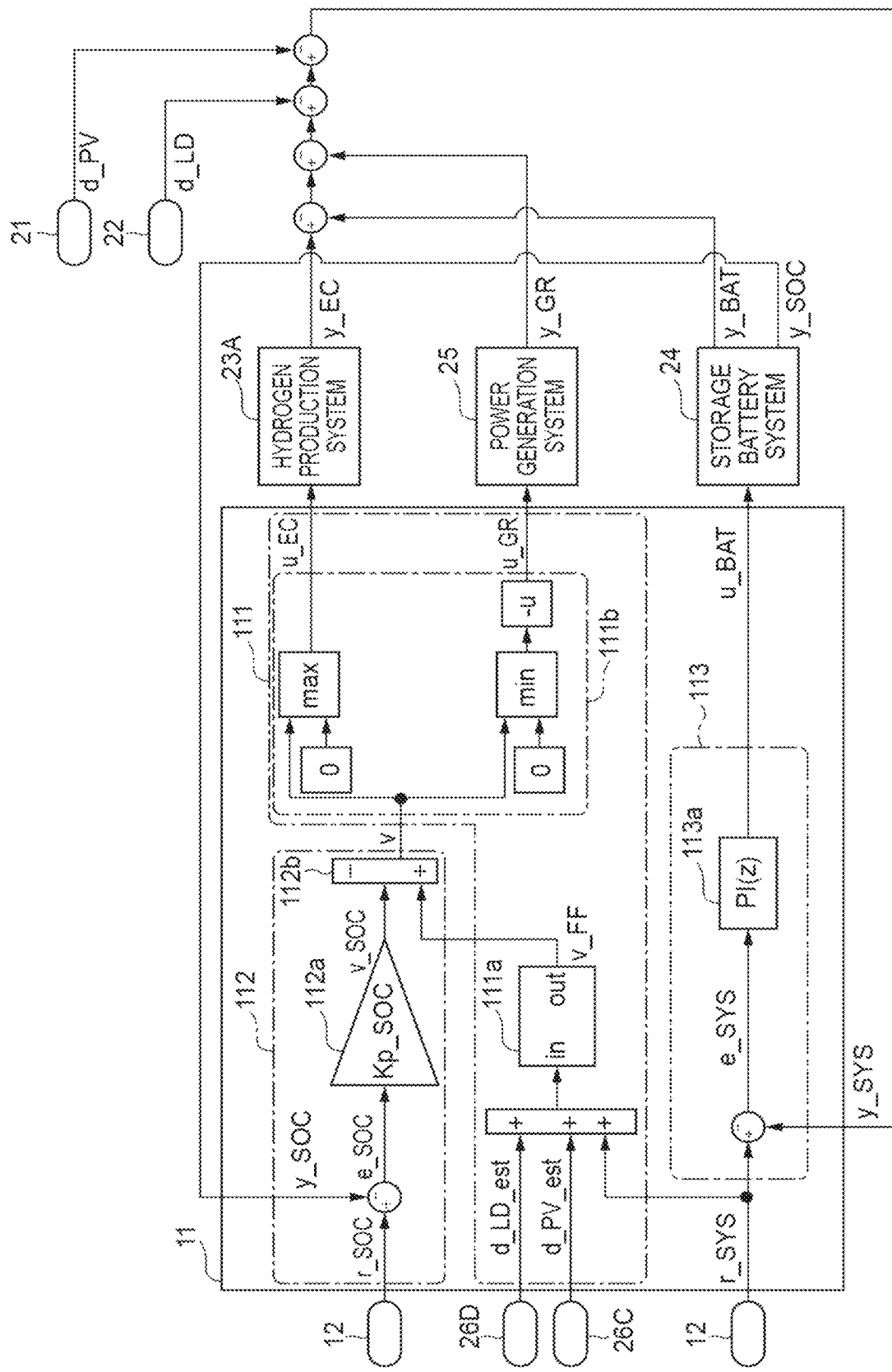
FIG. 3 is a block diagram of a command value generation unit illustrated in FIG. 2.

The content of control of the command value generation unit 11 will be described in more detail. FIG. 3 is a block diagram of the command value generation unit 11. Symbols in the drawings are as follows.

[Input Signal from Upper System]
  r_SOC: Target value of remaining storage battery capacity (SOC) [%].
  r_SYS: Target value of receiving/transmitting power [KW](Positive for Receiving Power, and Negative for Transmitting Power).

[Input Signal from Power Measurement Unit].
  y_SYS: Measured value of receiving/transmitting power [KW](Positive for Receiving Power and Negative for Transmitting Power).
  d_(PV_est): Measured value (or estimated value) of photovoltaic power generation power [KW].
  d_(LD_est): Measured value (or estimated value) of power consumption by power consumers [KW].

[Input Signal from Storage Battery System]
  y_SOC: Current remaining storage battery capacity (SOC) [%].

[Output Signal of Control Unit]
  u_EC: Power consumption command value to hydrogen production system [KW] (always Positive).
  u_GR: Generated power command value to the power generation system [KW] (always Positive).
  u_BAT: Charge/discharge power command value to storage battery system [KW] (Positive for charge and Negative for discharge).

[Plant Side Signal]
  y_EC: Power consumption of hydrogen production system [KW].
  y_GR: Generated power of the power generation system [KW].
  y_BAT: Charge/discharge power of the storage battery system [KW] (Positive for charge and Negative for discharge).
  d_PV: Photovoltaic power generation power [kW].
  d_LD: Power consumption of power consumer [KW].

[Parameters Inside Controller]
  Kp_SOC: Gain for SOC control [KW/%]

There is one consumer of power illustrated. However, in practice, it may be difficult to measure the power consumption of the consumer at a single point because the power consumption is associated with a plurality of feeder powers. In that case, the power consumption of the consumer may be calculated by addition, subtraction, or a combination of addition and subtraction of a plurality of power measurement values. For example, it is considered that power A output from one power supply device is distributed to power B, power C, power D, and power E. It is assumed that the power C, the power D, and the power E are electric power consumed by the power consumer. The power consumed by the consumer in this case can be obtained by adding the power C+the power D+the power E. The power consumed by the consumer can also be obtained by subtraction of the power A−the power B. When there is a consumer whose power consumption is stable although measurement is difficult, the power consumption of the consumer may be treated as a constant value in the above calculation. When it is determined that the power consumption is negligible, the constant value may be zero.

As illustrated in FIG. 3, the command value generation unit 11 is roughly divided into three calculation parts.

The first calculation part is the feedforward control unit 111.

The feedforward control unit 111 outputs a load command value (v_FF) to the power generation system 25 and the hydrogen production system 23A using an estimated value (d_(PV_est)) of power output from the photovoltaic power generation system 21, an estimated value (d_(LD_est)) of power consumed by the power consumer 22, and a target value (r_SYS) of the receiving/transmitting power. When the sign of the load command value (v_FF) is positive, it means consumption. When the sign of the load command value (v_FF) is negative, it means generation. The command value generation unit 11 generates a command value without using y_SYS, which is a controlled variable. That is, a so-called feedback loop is not formed.

The feedforward control unit 111 includes a smoothing filter 111a. The smoothing filter 111a functions to smooth the command value (v_FF) with respect to the power output from the photovoltaic power generation system 21, the power consumed by the power consumer 22, and the variation in the target value of the receiving/transmitting power.

In general, in the water electrolysis device included in the hydrogen production system 23A and the generator included in the power generation system 25, the efficiency of the equipment decreases when the operation state changes drastically. As a result, the physical burden on the device also increases. Therefore, it is desirable that the load command value (v_FF) fluctuates as gently as possible. As the smoothing filter 111a, a low-pass filter such as a moving average filter or a first order lag filter may be used. The smoothing filter 111a belongs to a feedforward system. Therefore, the load command value (v_FF) is not unstable.

The feedforward control unit 111 includes a distribution element 111b. The distribution element 111b distributes the load command value (v_FF) to the command value (u_EC) to the hydrogen production system 23A or the command value (u_GR) to the power generation system 25 according to the positive or negative sign of the load command value (v_FF). A positive sign of the load command value (v_FF) means adjustment on the consumption side. Therefore, the feedforward control unit 111 outputs the command value (u_EC=v_FF, u_GR=0). A negative sign of the load command value (v_FF) means adjustment on the generation side. Therefore, the feedforward control unit 111 outputs the command value (u_EC=0, u_GR=v_FF).

The second calculation part is the feedback control unit 113.

The feedback control unit 113 calculates the charge/discharge power (u_BAT) using the measurement value (y_SYS) of the receiving/transmitting power and the target value (r_SOC). The command value correction unit 112 constitutes a feedback control system.

The estimated value (d_(PV_est)) and/or the estimated value (d_(LD_est)) may deviate from the actual value. The variation of the power output from the photovoltaic power generation system 21, the variation of the power consumed by the power consumer 22, and the variation of the target value (r_SYS) of the receiving/transmitting power may exceed the load followability of the water electrolysis device and/or the load followability of the power generation system in the hydrogen production system 23A. For these reasons, the followability of the receiving/transmitting power may be insufficient only by the feedforward control executed by the feedforward control unit 111 which is the first calculation part.

Therefore, feedback control is performed by the storage battery system 24 having a fast response speed. When the error of the estimated value described above can be ignored, the charge/discharge power is 0 kW in a steady state due to the effect of the feedforward control. Similarly, even in a case where the variation of the power output from the photovoltaic power generation system 21, the variation of the power consumed by the power consumer 22, and the variation of the target value (r_SYS) of the receiving/transmitting power can be regarded as constant values, the charge/discharge power becomes 0 kW in the steady state due to the effect of the feedforward control. This characteristic is desirable in the storage battery system 24 having energy loss due to charge/discharge and limited storage capacity.

To summarize the above description, the variation of the power output from the photovoltaic power generation system 21, the variation of the power consumed by the power consumer 22, and the variation of the target value (r_SYS) of the receiving/transmitting power include a long-period variation component and a short-period variation component. Then, the hydrogen production system 23A and/or the power generation system 25 is responsible for coping with the long-period variation. The storage battery system 24 is responsible for coping with the short-period variation.

The third calculation part is the command value correction unit 112.

The command value correction unit 112 corrects the load command value (v_FF) based on the SOC for keeping the SOC of the storage battery system 24 in an appropriate range and the SOC target value (r_SOC). The command value correction unit 112 includes a correction element 112b. The correction element 112b subtracts the correction command value (v_SOC) from the load command value (v_FF). This operation has two meanings. First, when the SOC is higher than the target value (r_SOC) of the SOC, it means that the power consumption of the hydrogen production system 23A is increased. Second, it means that correction is performed to lower the generated power of the power generation system 25. In other words, when the SOC is lower than the target value (r_SOC), the power consumption of the hydrogen production system 23A is reduced or the generated power of the power generation system is increased.

As described above, the storage battery system 24 performs feedback control. Therefore, by correcting the load of the hydrogen production system 23A and/or the power generation system 25, the storage battery system 24 can recover the remaining capacity of the storage battery to an appropriate range.

[Hardware Configuration]

Figure 4:
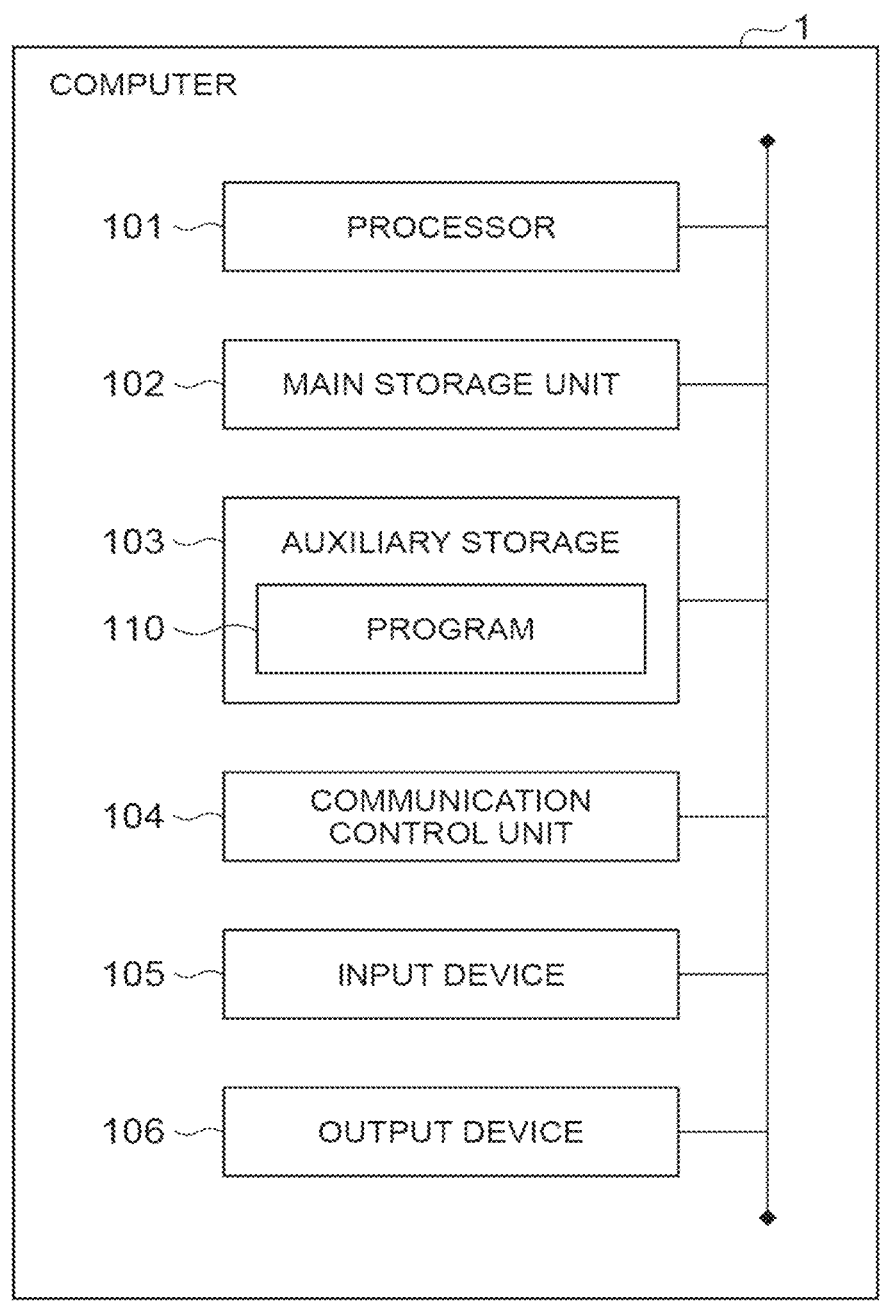
FIG. 4 is a diagram illustrating an example of a hardware configuration of the energy management system.

A hardware configuration of the EMS 1 will be described with reference to FIG. 4. FIG. 4 is a diagram illustrating an example of the hardware configuration of the EMS 1. The EMS 1 includes one or a plurality of computers 100. The computer 100 includes a central processing unit (CPU) 101, a main storage unit 102, an auxiliary storage unit 103, a communication control unit 104, an input device 105, and an output device 106. The EMS 1 includes one or a plurality of computers 100 including the hardware and software such as a program.

In a case where the EMS 1 includes a plurality of computers 100, these computers 100 may be locally connected or may be connected via a communication network such as Internet or an intranet. With this connection, one EMS 1 is logically constructed.

The CPU 101 executes an operating system, an application program, and the like. The main storage unit 102 is configured with a read only memory (ROM) and a random access memory (RAM). The auxiliary storage unit 103 is a storage medium configured with a hard disk, a flash memory, and the like. Generally, the auxiliary storage unit 103 holds a larger amount of data than the main storage unit 102. The communication control unit 104 is constituted by a network card or a wireless communication module. The input device 105 is configured with a keyboard, a mouse, a touch panel, a voice input microphone, and the like. The output device 106 is configured with a display, a printer, and the like.

The auxiliary storage unit 103 stores a program 110 and data necessary for processing in advance. The program 110 causes the computer 100 to execute each functional element of the EMS 1. For example, the program 110 is read by the CPU 101 or the main storage unit 102, and operates at least one of the CPU 101, the main storage unit 102, the auxiliary storage unit 103, the communication control unit 104, the input device 105, and the output device 106. For example, the program 110 performs reading and writing of data in the main storage unit 102 and the auxiliary storage unit 103.

The program 110 may be provided after being recorded on a tangible recording medium such as a CD-ROM, a DVD-ROM, or a semiconductor memory, for example. The program 110 may be provided as a data signal via a communication network.

Function of Effect

Functions of effects of the power system adjusting device and the power system adjusting program of the present disclosure will be described. Before describing functions of effects, problems in the prior art exemplified in Patent Literatures 1 to 4 will be described.

Description has already been given that a power system including a P2G system is required to have sustainability and immediate responsiveness. In particular, the immediate responsiveness is also important from the viewpoint of $CO_2$-free hydrogen production. In a system with low immediate responsiveness, when the power output from the renewable energy device suddenly drops, the power from the power system may be consumed by the water electrolysis device. Unless the system power is $CO_2$-free power, hydrogen produced by the above-mentioned equipment cannot be referred to as $CO_2$-free hydrogen. However, it is known that a contract for $CO_2$-free system power generally requires a higher power charge than a general power contract.

In the technique disclosed in Patent Literature 1, as described in paragraph 0052 of Patent Literature 1, the storage battery is first charged when surplus power is present. In a case where a state of charge (SOC), which is an index representing the remaining capacity of the battery, exceeds a certain threshold, a water electrolysis device included in the hydrogen production device is operated. The case of exceeding a certain threshold means a case where the storage battery is fully charged. In such so-called if-then logic, when the capacity of the storage battery is small, the storage battery is immediately fully charged. That is, in almost all cases, as illustrated in Step S112 in FIG. 2 of Patent Literature 1, surplus power needs to be consumed by hydrogen production. However, as described above, the water electrolysis device alone cannot completely absorb variations in generated power of variable renewable energy such as photovoltaic power generation. That is, it is difficult to control the receiving/transmitting power from the viewpoint of the performance of the device.

The technique disclosed in Patent Literature 2 focuses on a delay in responsiveness of a hydrogen production facility. As disclosed in paragraph 0007 of Patent Literature 2, the technique disclosed in Patent Literature 2 matches the input power to the hydrogen production facility with the target value before the start time of the demand response. However, during the start of the demand response, that is, during the power adjustment, the generated power of the adjacent renewable energy device or the generated power of the renewable energy device included in the microgrid is expected to fluctuate. Therefore, it is also difficult to control the receiving/transmitting power by the technology disclosed in Patent Literature 2, similarly to Patent Literature 1.

The technique disclosed in Patent Literature 3 controls receiving/transmitting power from/to a power system using only a storage battery. When the technology disclosed in Patent Literature 3 is applied to the above-described P2G system, the capacity of the storage battery needs to be sufficiently large. The adoption of a storage battery having a large capacity is undesirable because it leads to an increase in purchase cost and maintenance cost. Therefore, the technology disclosed in Patent Literature 3 has a problem in sustainability.

The technique disclosed in Patent Literature 4 attempts to consume power of photovoltaic power generation using only a water electrolysis device having relatively low responsiveness. Therefore, the technique disclosed in Patent Literature 4 has a problem from the viewpoint of immediate responsiveness. In fact, with reference to FIG. 5 of Patent Literature 4, it can be seen that the power consumption of the water electrolysis device is severely fluctuated due to the variation of the power of the photovoltaic power generation. Such an operation is expected to cause a problem that the efficiency of the water electrolysis device is deteriorated. Furthermore, it is assumed that there is a problem that power other than photovoltaic power generation is included in the power supplied to the water electrolysis device. The technique disclosed in Patent Literature 4 controls distribution power on the basis of a threshold. As a result, in the technique disclosed in Patent Literature 4, the power consumption command value tends to be a discontinuous signal.

The EMS 1, which is a power system adjusting device of the present disclosure, solves the problem of the technology disclosed in Patent Literatures 1 to 4 described above with the following configurations.

The microgrid 2 includes the photovoltaic power generation system 21 that generates power using renewable energy, the power generation system 25 that has a first responsiveness and is capable of adjusting power to be output, the hydrogen production system 23A that is capable of adjusting power to be consumed, the storage battery system 24 that has a second responsiveness equivalent to the first responsiveness or equal to or greater than the first responsiveness, stores received power, and outputs stored power, and the power consumer 22 including equipment that consumes power output from the photovoltaic power generation system 21, power output from the power generation system 25, and power output from the storage battery system 24. The EMS 1 applied to the microgrid 2 includes a target presentation unit 12 indicating target power, a power acquisition unit 13 that obtains combined power obtained by adding power output from the photovoltaic power generation system 21, power output from the power generation system 25, power consumed by the hydrogen production system 23A, power output or consumed by the storage battery system 24, and power consumed by the power consumer 22, and a command value generation unit 11 that outputs a first command value and a second command value such that the combined power asymptotically approaches the target power. The combined power includes a long- and intermediate-period component including a first variation component and a short-period component including a second variation component belonging to a frequency band higher than the first variation component. The command value generation unit 11 outputs the first command value corresponding to the long- and intermediate-period component to power generation system 25 and/or hydrogen production system 23A, and outputs the second command value corresponding to the short-period component to the storage battery system 24.

In other words, the EMS 1 includes the photovoltaic power generation system 21, the power consumer 22, the storage battery system 24, the power generation system 25, and the hydrogen production system 23A, and controls the microgrid 2 capable of exchanging energy with the outside. The EMS 1 controls the charge/discharge power of the storage battery system 24, the power consumption of the hydrogen production system 23A, and the generated power of the power generation system 25 such that the upstream power, at which the generated power of the photovoltaic power generation system 21, the output power of the storage battery system 24, the power consumption of the power consumer 22, the power consumption of the hydrogen production system 23A, and the generated power of the power generation system 25 are combined, becomes desired target value (r_SYS). In the EMS 1, with respect to variations of the generated power of the photovoltaic power generation system 21, the target value (r_SYS) of the upstream power described above, and the power consumption of other connected power consumers, the hydrogen production system 23A and the power generation system 25 correspond to the long- and intermediate-period component power of the variation component, and the storage battery system 24 corresponds to the short-period component power.

The EMS 1 causes the power generation system 25 and the hydrogen production system 23A to bear the long- and intermediate-period component for the variation of the combined power including the power based on the renewable energy. According to this configuration, it is possible to obtain sustainability of continuously adjusting power. The EMS 1 causes the storage battery system 24 to bear the short-period component. According to this configuration, it is possible to obtain a power adjusting speed at which power based on unstable renewable energy can be immediately absorbed before flowing to the power system 3. Therefore, immediate responsiveness can be obtained. As a result, the EMS 1 can achieve both immediate responsiveness and sustainability.

The EMS 1 improves the immediate responsiveness of the system by combining the water electrolysis device included in the hydrogen production system 23A, which is a power consumption device, and a small-capacity storage battery. The EMS 1 performs feedforward control on the hydrogen production system 23A, which is a power consumption device, using the generated power of the photovoltaic power generation system 21, the power consumption of the power consumer 22, and the target value (r_SYS) of the receiving/transmitting power. The EMS 1 performs feedback control on the storage battery system 24 using the receiving/transmitting power and the target value (r_SYS) of the receiving/transmitting power. By these controls, the long-period variation component and the medium-period variation component of the renewable energy can be consumed in the hydrogen production system 23A. Further, short-period variation components of renewable energy can be absorbed by the storage battery system 24.

A configuration is assumed in which both the hydrogen production system 23A including the water electrolysis device and the storage battery system 24 are controlled by feedback control using the receiving/transmitting power and the target value (r_SYS) of the receiving/transmitting power. This control system corresponds to a controller design of one input and two outputs. Generally, for a control system having one input and two outputs, design of stability of a closed loop system and the like is complicated. However, the EMS 1 of the present disclosure combines the feedforward control and the feedback control of one input and one output. Therefore, it is easy to design each control system. Adjustment is also easy. For example, a PID controller generally well known as a feedback controller of one input and one output can be used for the feedback control unit 113.

The power acquisition unit 13 included in the EMS 1 further acquires the power output from the photovoltaic power generation system 21 and the power consumed by the power consumer 22. The command value generation unit 11 generates the first command value corresponding to the long- and intermediate-period component using the power output from the photovoltaic power generation system 21, the power consumed by the power consumer 22, the power output or consumed by the storage battery system 24, and the target power. The command value generation unit 11 generates the second command value corresponding to the short-period component using the combined power and the target power. According to this configuration, the EMS 1 can generate the first command value that realizes sustainability required. The EMS 1 can also generate the second command value that realizes the power adjusting speed required.

In other words, the EMS 1 determines the power generation command value for the power generation system 25 and the load power command value for the hydrogen production system 23A based on the generated power of the photovoltaic power generation system 21, the target value (r_SYS) of the upstream power described above, and the power consumption of the power consumer 22. The EMS 1 determines a command value of the charge/discharge power of the storage battery system 24 based on the upstream power and the target value (r_SYS) of the upstream power described above.

The power acquisition unit 13 included in the EMS 1 further acquires power stored in the storage battery system 24. The target presentation unit 12 further indicates a target stored energy value which is a target value of the power stored in the storage battery system 24. The command value generation unit 11 generates the second command value such that the remaining amount of power stored in the storage battery system 24 asymptotically approaches the target stored energy value. According to this configuration, the remaining amount of power stored in the storage battery system 24 can be caused to asymptotically approach a desired amount.

In other words, when the remaining capacity of the storage battery system 24 is low, the EMS 1 corrects the command value so that the power generation system 25 increases the generated power. When the remaining capacity of the storage battery system 24 is low, the EMS 1 corrects the command value to cause the hydrogen production system 23A to reduce the load power. Conversely, when the remaining capacity of the storage battery system 24 is high, the EMS 1 corrects the command value so that the power generation system 25 decreases the generated power. When the remaining capacity of the storage battery system 24 is high, the EMS 1 corrects the command value to cause the hydrogen production system 23A to increase the load power. As a result, the remaining capacity of the storage battery system 24 can be caused to asymptotically approach a desired capacity. This can improve the sustainability of the P2G system.

Conventionally, a large-capacity storage battery has been required for power adjustment. According to the EMS 1, power can be controlled by a storage battery having a small capacity. Storage batteries are expensive. The price of a storage battery generally tends to be proportional to the storage battery capacity. Therefore, the present technology is useful in terms of cost because power can be controlled using a small-capacity storage battery.

The above technique maintains the remaining capacity of the storage battery system 24 by introducing feedback control. As a result, full charge and/or overdischarge of the storage battery system 24 can be prevented. When the battery is fully charged and/or overdischarged, the operation of the storage battery system 24 needs to be stopped. When the operation of the storage battery system 24 is stopped, the ability to adjust the power of the P2G system decreases. When the operation of the storage battery system 24 is stopped, the ability to adjust the power of the P2G system is lost. According to the EMS 1, it is possible to suppress deterioration and loss of the ability to adjust the power of the P2G system. The storage battery system 24 can be operated while avoiding a fully charged and/or overdischarged state. For example, it is known that performance deterioration of a storage battery is accelerated when a lithium ion battery continues to be overdischarged or fully charged. That is, in the storage battery system 24 including the lithium ion battery, an effect of reducing deterioration of battery performance can be expected.

The microgrid 2 includes the photovoltaic power generation system 21 that generates power using renewable energy, the power generation system 25 that has a first responsiveness and is capable of adjusting power to be output and/or the hydrogen production system 23A that is capable of adjusting power to be consumed, the storage battery system 24 that has a second responsiveness equivalent to the first responsiveness or equal to or greater than the first responsiveness, stores received power, and outputs stored power, and the power consumer 22 including equipment that consumes power output from the photovoltaic power generation system 21, power output from the power generation system 25, and power output from the storage battery system 24. The EMS 1 applied to the microgrid 2 includes a target presentation unit 12 that indicates target power, a power acquisition unit 13 that obtains power output from the photovoltaic power generation system 21, power consumed by the power consumer 22, and power output or consumed by the storage battery system 24, and a command value generation unit 11 that outputs a first command value and a second command value such that combined power obtained by adding the power output from the photovoltaic power generation system 21, the power consumed by the power consumer 22, and the power output or consumed by the storage battery system 24 asymptotically approaches the target power. The command value generation unit 11 generates the first command value corresponding to the long- and intermediate-period component using the power output from the photovoltaic power generation system 21, the power consumed by the power consumer 22, the power output or consumed by the storage battery system 24, and the target power, and generates the second command value corresponding to the short-period component using the combined power and the target power.

In other words, the EMS 1 includes the photovoltaic power generation system 21, the storage battery system 24, the power generation system 25, and the hydrogen production system 23A, and controls the microgrid 2 capable of exchanging energy with the outside. The EMS 1 controls the charge/discharge power of the storage battery system 24, the power consumption of the hydrogen production system 23A, and the generated power of the power generation system 25 such that the upstream power, at which the generated power of the photovoltaic power generation system 21, the output power of the storage battery system 24, the power consumption of the hydrogen production system 23A, and the generated power of the power generation system 25 are combined, becomes desired target value ($r\_SYS$). The EMS 1 determines a command value ($u\_GR$) for the power generation system 25 and a command value ($u\_EC$) for the hydrogen production system 23A based on the generated power of the photovoltaic power generation system 21, the target value ($r\_SYS$) of the upstream power described above, and the power consumption of the power consumer 22. The EMS 1 further determines a command value ($u\_BAT$) for controlling charge/discharge of the storage battery system 24 based on the upstream power and the target value ($r\_SYS$) of the upstream power.

The EMS 1 applied to the microgrid 2 described above generates the first command value corresponding to the long- and intermediate-period component using the power output from the photovoltaic power generation system 21, the power consumed by the power consumer 22, the power output or consumed by the storage battery system 24, and the target power. According to this configuration, it is possible to obtain sustainability of continuously adjusting power. The EMS 1 of the microgrid 2 described above generates the second command value corresponding to the short-period component using the combined power and the target power. According to this configuration, it is possible to obtain a power adjusting speed at which power based on unstable renewable energy can be immediately absorbed before flowing to the power system. That is, immediate responsiveness can be obtained. As a result, the EMS 1 can achieve both immediate responsiveness and sustainability.

[Premise of Simulation]

Hereinafter, the operation of the EMS 1 is verified through simulation. The performance of each device constituting the microgrid 2 was defined as follows.

Output power of photovoltaic power generation system 21: Rated 1000 kW.

Output power of hydrogen production system 23A: Rated 1000 kW.

Output power of power generation system 25: Rated 1000 kW.

Performance of the storage battery: Capacity 500 kWh, charge/discharge power±500 kW.

Time constant of storage battery system 24: 0.01 sec.

Time constant of hydrogen production system 23A: 5 sec.

Time constant of power generation system 25: 5 sec.

The characteristics of the elements constituting the EMS 1 are defined as follows.

Target value (r_SOC) of remaining storage battery capacity: 50% at all times

Gain (Kp_SOC): 1.

Smoothing filter 111$a$: First order lag filter.

Time constant of smoothing filter 111$a$: 150 seconds.

Sampling cycle of measurement value (d_(PV_est)) of generated power of photovoltaic power generation system 21: 1 second.

Measured value of power consumption by power consumer 22(d_(LD_est)): 1 seconds.

Figure 5:
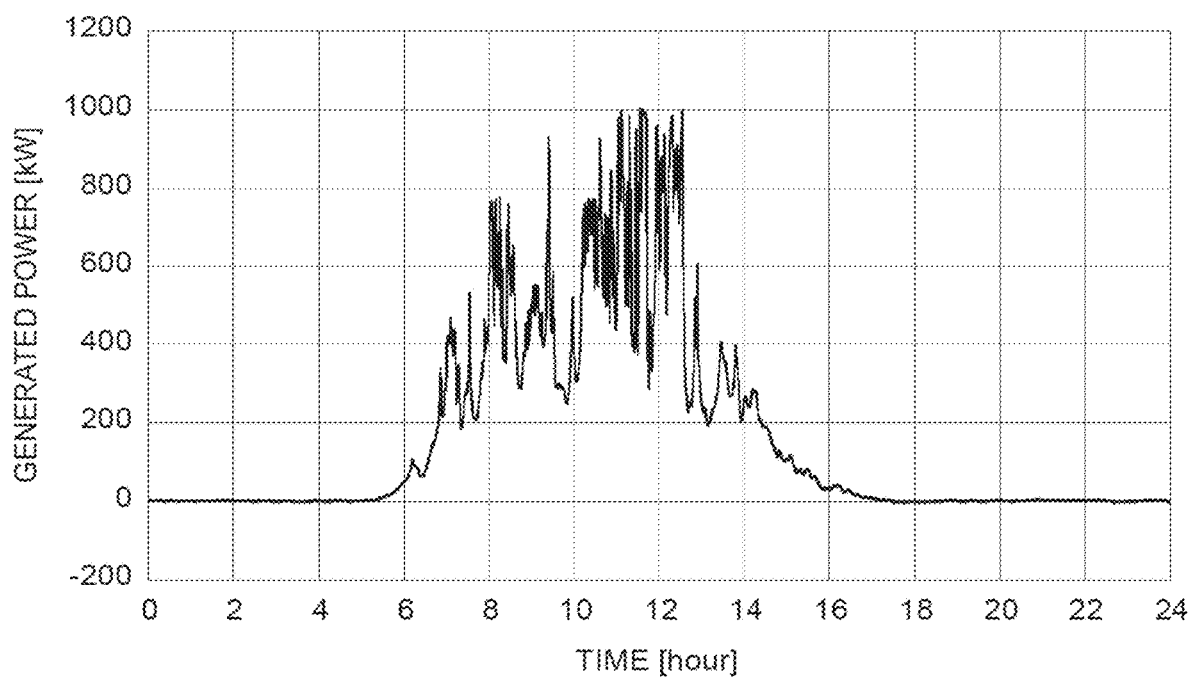
FIG. 5 is a graph illustrating variations of generated power output from a photovoltaic power generation system.

FIG. 5 is a graph illustrating variations of generated power output from the photovoltaic power generation system 21. In the daytime, the generated power fluctuates. The variation of the generated power is due to the influence of the cloud.

Example 1

In Example 1, a condition of power transmission of 5 kW at all times is set as a target value (r_SYS) of the receiving/transmitting power. The microgrid 2 cannot use the power generation system 25. A generated power command value (u_GR=0) is set as a condition under which the power generation system 25 cannot be used. This setting is equivalent to producing so-called $CO_2$-free hydrogen using only electric power generated by a renewable energy device included in the microgrid 2. The power consumption (d_LD) of the power consumer 22 is 0 kW.

Figure 6:
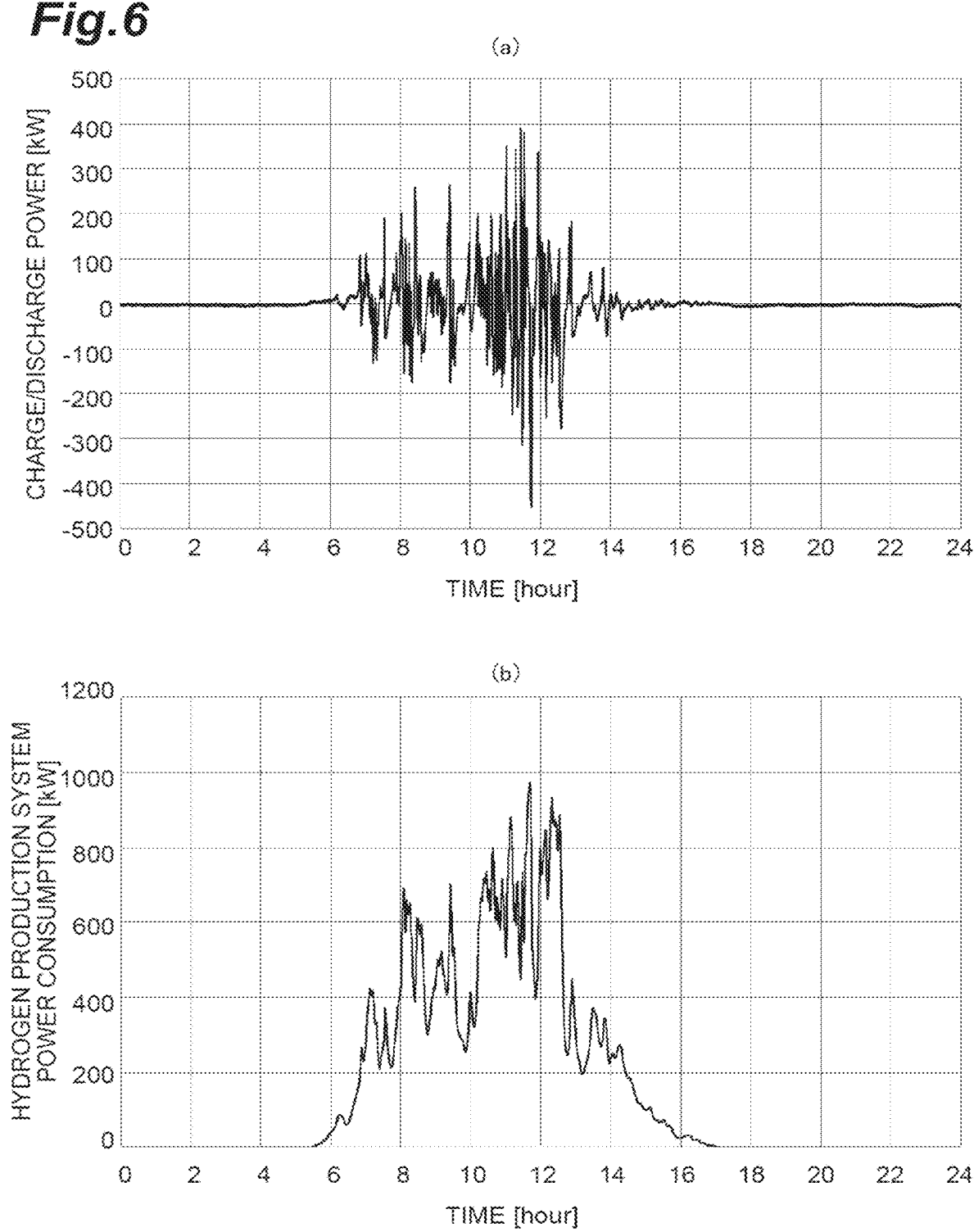
FIG. 6(*a*) is a graph illustrating charge/discharge power of a storage battery system.
Figure 7:
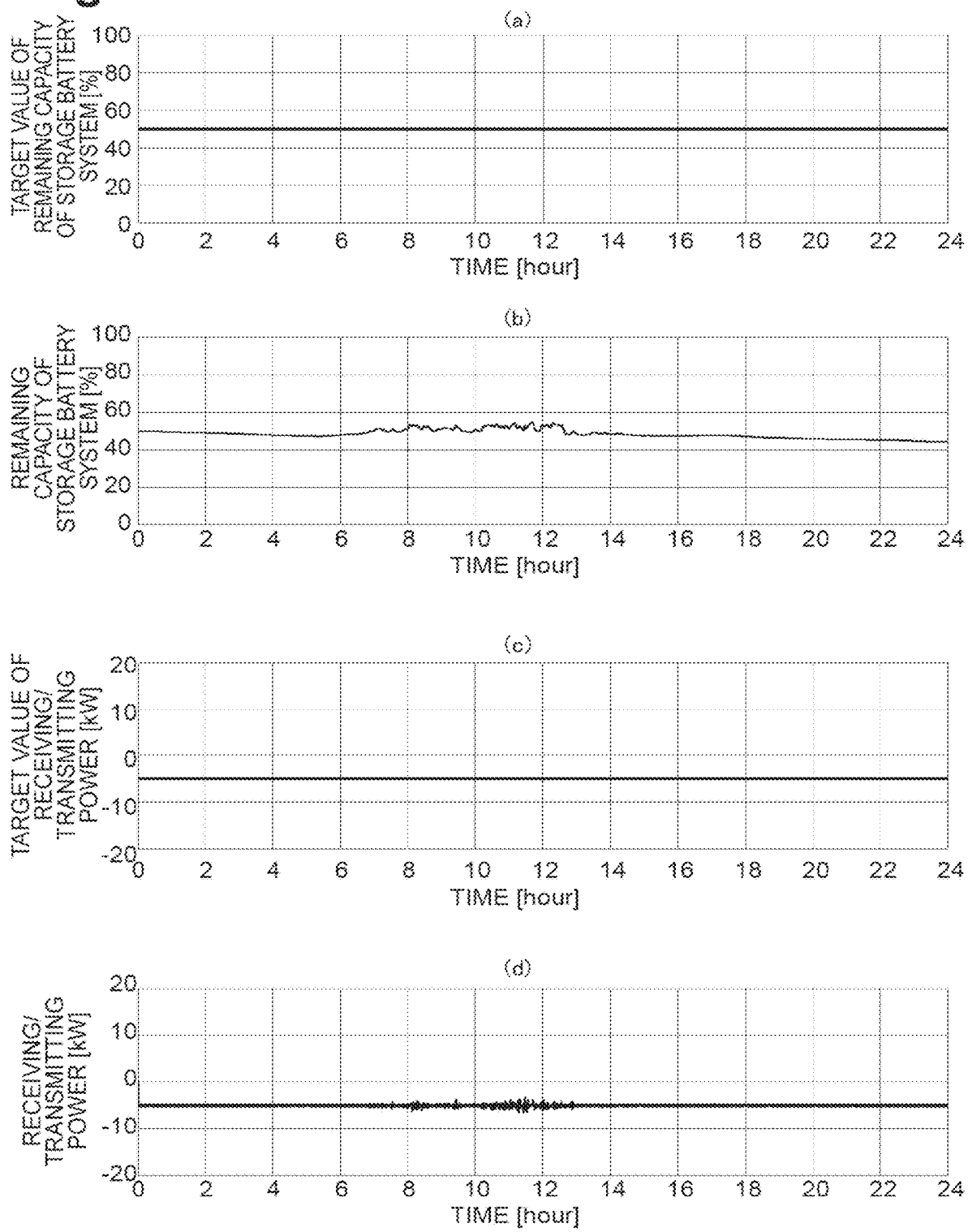
FIG. 7(*a*) is a graph illustrating target values of a remaining amount of the storage battery system.

FIGS. 6 and 7 illustrate the results of the simulation of Example 1. FIG. 6($a$) illustrates charge/discharge power of the storage battery system 24. FIG. 6($b$) illustrates power consumption of the hydrogen production system 23A. Referring to FIG. 6($a$), it has been found that the short-period component is compensated for by the storage battery system 24 with respect to the variation of the generated power of the photovoltaic power generation system 21 (see FIG. 5). The variation appearing in the graph illustrated in FIG. 6($a$) corresponds to a short-period component including a second variation component. It can also be said that the graph of FIG. 6($a$) illustrates the responsiveness of the storage battery system 24.

Referring to FIG. 6($b$), it has been found that the long- and intermediate-period component is compensated for by the hydrogen production system 23A with respect to the variation of the generated power of the photovoltaic power generation system 21 (see FIG. 5). The variation appearing in the graph illustrated in FIG. 6($b$) corresponds to a long- and intermediate-period component including a first variation component. It can also be said that the graph of FIG. 6($b$) illustrates the responsiveness of the hydrogen production system 23A.

Comparing FIG. 6($a$) with FIG. 6($b$), it was found that the graph of FIG. 6($a$) fluctuates in a shorter period. It can be seen that the short-period component appearing in the graph illustrated in FIG. 6($a$) includes a frequency component higher than the long- and intermediate-period component appearing in the graph illustrated in FIG. 6($b$). In other words, it can be seen that the short-period component appearing in the graph illustrated in FIG. 6($a$) has a period shorter than the long- and intermediate-period component appearing in the graph illustrated in FIG. 6($b$).

Comparing FIG. 6($a$) with FIG. 6($b$), it was found that the graph of FIG. 6($a$) fluctuates in a shorter period. As a result, it was also found that the responsiveness of the hydrogen production system 23A (first responsiveness) is higher than the responsiveness of the hydrogen production system 23A (second responsiveness).

When the time constant of the smoothing filter 111$a$ is further increased, the power consumption of the hydrogen production system 23A can be further smoothed. On the other hand, when the time constant of smoothing filter 111$a$ is increased, charge/discharge power command value (u_BAT) of storage battery system 24 increases. As a result, it may exceed the rating of the storage battery system 24. The waveform of the command value (u_EC) to the hydrogen production system 23A is substantially the same as the waveform in FIG. 6($a$). The waveform of the command value (u_BAT) to the storage battery system 24 is also substantially the same as the waveform in FIG. 6($b$). Therefore, illustration of the waveform of the command value (u_EC) to the hydrogen production system 23A and the waveform of the command value (u_BAT) to the storage battery system 24 is omitted.

FIG. 7($a$) illustrates a target value (r_SOC) of the remaining capacity of the storage battery system 24. FIG. 7($b$) illustrates a remaining capacity (y_SOC) of the storage battery system 24. Referring to FIGS. 7($a$) and 7($b$), it is found that the storage battery system 24 is discharging in the time zone in which the generated power of the photovoltaic power generation system 21 is low (from 0:00 to 7:00). Specifically, it has been found that the storage battery system 24 transmits power of 5 kW. As a result, it was also found that the SOC of the storage battery system 24 gradually decreases (see FIG. 7($b$)). On the other hand, it has also been found that the SOC is gradually recovered to an appropriate range by using the generated power of the photovoltaic power generation system 21 in the daytime.

FIG. 7($c$) illustrates target values (r_SYS) of receiving/transmitting power. The target value (r_SYS) of the receiving/transmitting power is set as a fixed value of −5 kW. FIG. 7($d$) illustrates the receiving/transmitting power. Referring to FIGS. 7($c$) and 7($d$), it is found that the receiving/transmitting power illustrated in FIG. 7($d$) can be controlled to be a constant value with high accuracy with respect to the target value (r_SYS) of the receiving/transmitting power illustrated in FIG. 7($c$). It was also found that the receiving/transmitting power was always on the negative side. This means that power has never been received. Therefore, it has been found that all the power used in the hydrogen production system 23A is the generated power output from the photovoltaic power generation system 21. That is, the produced hydrogen could be proved to be $CO_2$-free hydrogen.

Example 2

Figure 8:
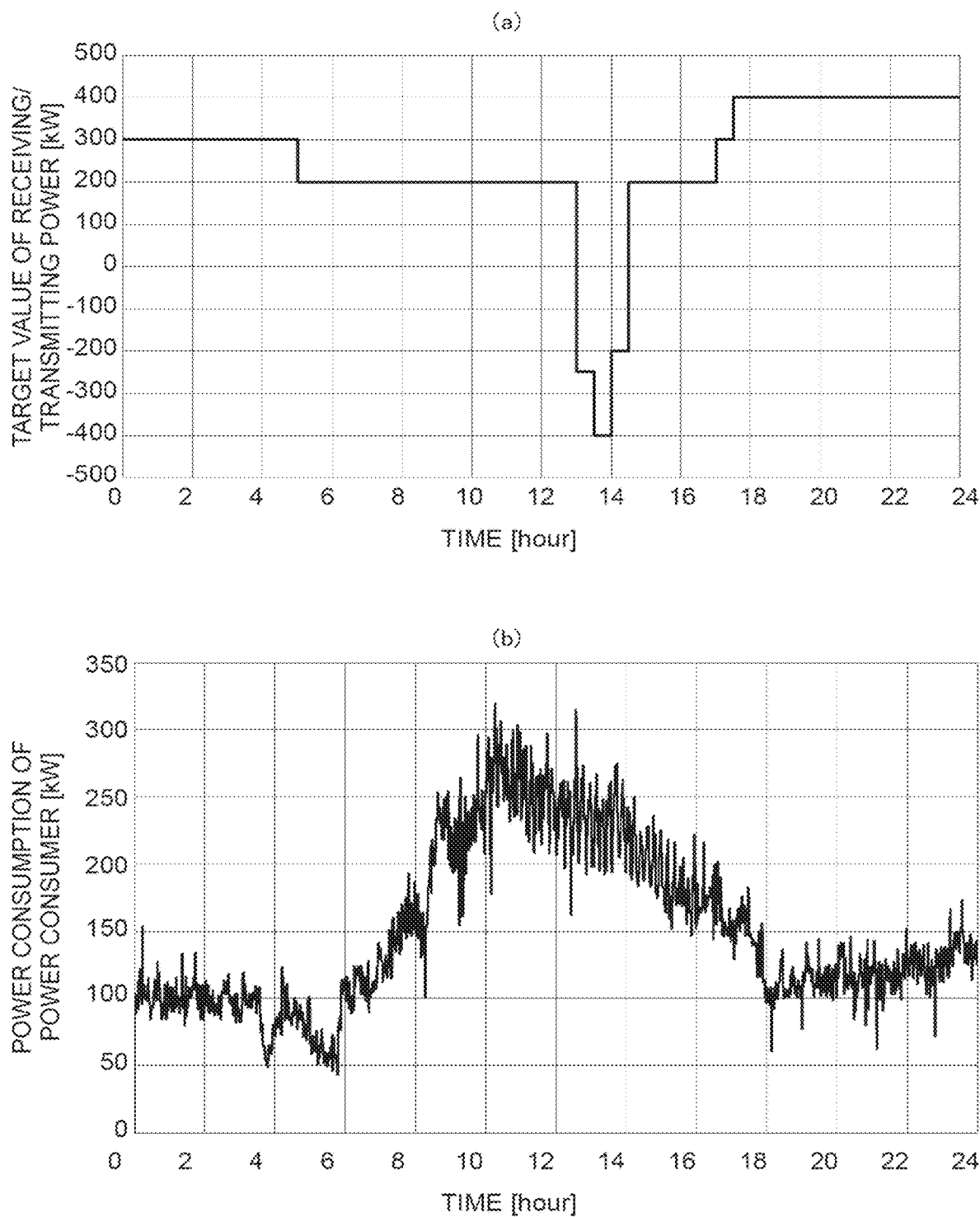
FIG. 8(*a*) is a graph illustrating target values of receiving/transmitting power in Example 2.

FIG. 8($a$) illustrates target values (r_SYS) of receiving/transmitting power in Example 2. Unlike Example 1, in Example 2, the target value (r_SYS) of the receiving power is mainly given. This is assumed to be a case where the operator or the upper system determines that it is better to perform hydrogen production even if power is purchased in consideration of the market power price, the hydrogen price, and the like comprehensively. As illustrated in the graph of FIG. 8(a), the power transmission target value is switched for about one and a half hours from 13:00. This is a setting assuming a case where a demand response is received from a general power transmission and distribution company due to a power supply and demand shortage or the like. It is not always necessary that all the target values of the receiving/transmitting power for 24 hours are determined at 0:00. The target value may be determined at that time.

FIG. 8(b) illustrates set values of power consumption of power consumer 22. In Example 1, it is assumed that the microgrid 2 cannot use the power generation system 25. In Example 2, it can use the power generation system 25.

Figure 9:
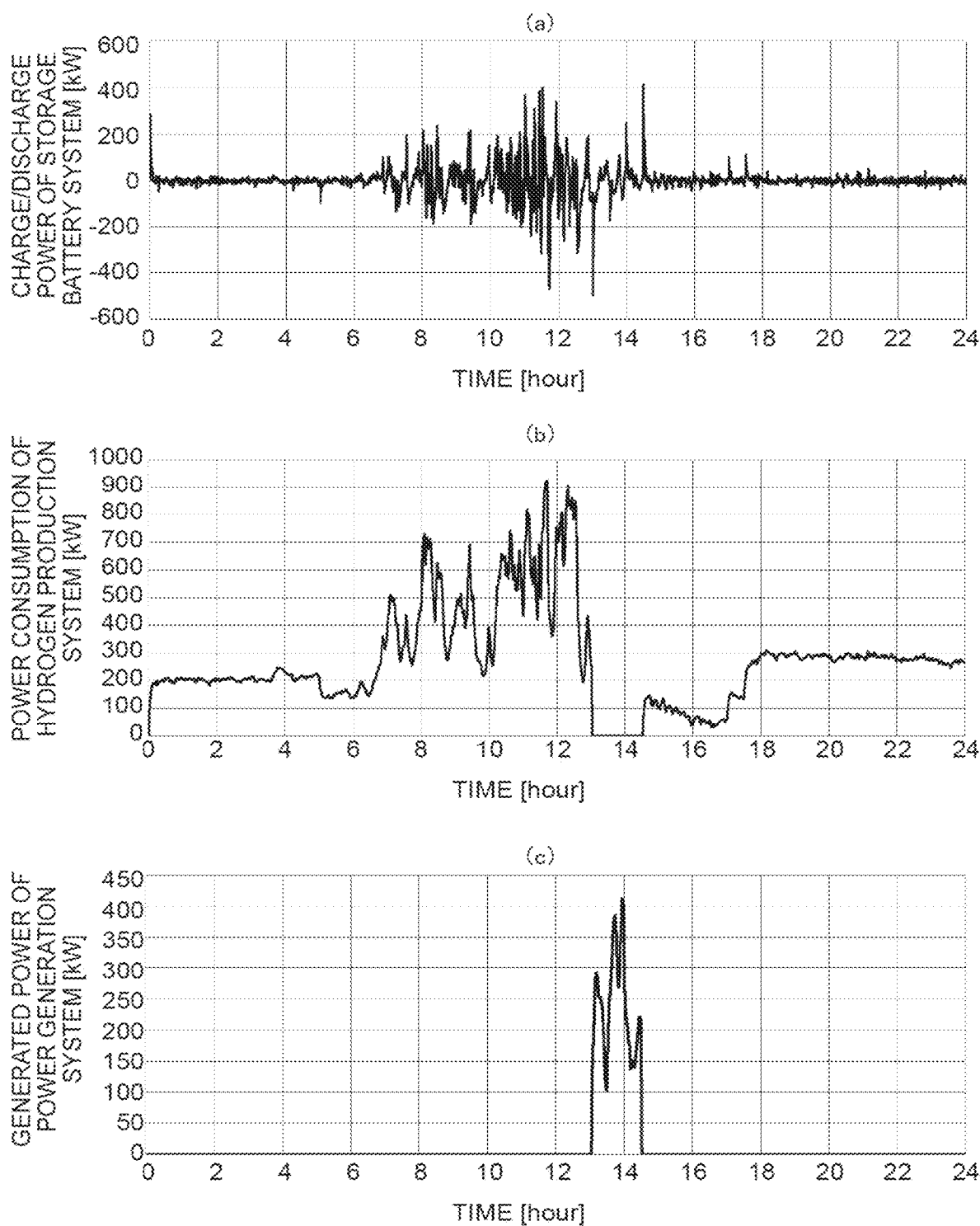
FIG. 9(*a*) is a graph illustrating charge/discharge power of the storage battery system.
Figure 10:
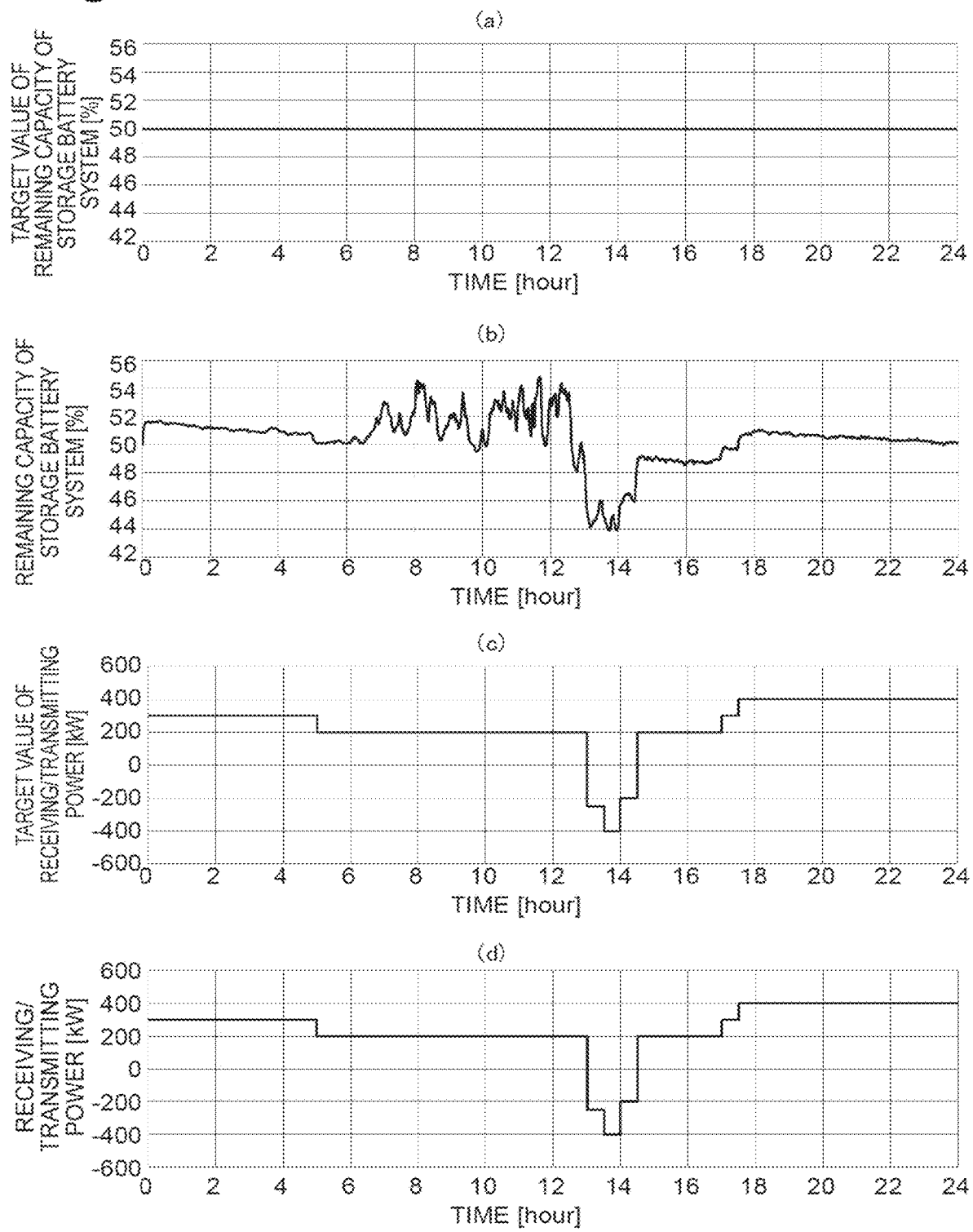
FIG. 10(*a*) is a graph illustrating target values of a remaining amount of the storage battery system.

FIGS. 9 and 10 illustrate the results of the simulation of Example 2. FIG. 9(a) illustrates charge/discharge power of the storage battery system 24. FIG. 9(b) illustrates power consumption of the hydrogen production system 23A. FIG. 9(c) illustrates generated power of the power generation system 25. Referring to FIG. 9(a), it has been found that the storage battery system 24 performs control to compensate for a variation in a high cycle in a variation of the generated power of the photovoltaic power generation system 21, a variation of the power consumption of the power consumer 22, and a variation of the target value (r_SYS) of the receiving/transmitting power. Referring to FIG. 9(b), it has been found that the hydrogen production system 23A performs control to compensate for a variation in a low cycle in a variation of the generated power of the photovoltaic power generation system 21, a variation of the power consumption of the power consumer 22, and a variation of the target value (r_SYS) of the receiving/transmitting power. Similarly, referring to FIG. 9(c), it has been also found that the power generation system 25 performs control to compensate for a variation in a low cycle in a variation of the generated power of the photovoltaic power generation system 21, a variation of the power consumption of the power consumer 22, and a variation of the target value (r_SYS) of the receiving/transmitting power.

Referring to FIGS. 9(b) and 9(c), it is found that the hydrogen production system 23A is stopped at the time of power transmission, and power is generated by the power generation system 25. Since the command values are substantially the same, illustration thereof is omitted.

FIG. 10(a) illustrates a target value (r_SOC) of the remaining capacity of the storage battery system 24. FIG. 10(b) illustrates a remaining capacity (y_SOC) of the storage battery system 24. Referring to FIG. 10(b), it was found that the SOC was maintained in an appropriate range.

FIG. 10(c) is target values (r_SYS) of receiving/transmitting power. FIG. 10(d) is receiving/transmitting power (y_SYS). It has been found that the receiving/transmitting power (y_SYS) illustrated in FIG. 10(d) can be controlled to accurately follow the target value (r_SYS) illustrated in FIG. 10(c).

In general, when power is procured from the market, if there is a gap between the planned amount of power and the amount of power actually used, the gap is separately collected as an imbalance charge. The demand response also needs to satisfy the specified required accuracy. Therefore, the system including the EMS 1 capable of achieving accurate power receiving/transmitting power with respect to the target value (r_SYS) does not need to pay a large imbalance fee. It is also possible to receive a separate reward by providing an adjustment force such as a demand response. As a result, the hydrogen production cost can be further reduced.

When the microgrid 2 has both the hydrogen production system 23A and the power generation system 25 and only one of them is always used, the facility operation rate is low as a whole. Therefore, at a glance, it seems to be economically unreasonable that the microgrid 2 has both the hydrogen production system 23A and the power generation system 25. However, a specific microgrid may include a fuel cell that uses hydrogen in the microgrid as an emergency fuel as a regional disaster countermeasure (BCP support). In that case, since the fuel cell is used only at the time of disaster, the operation rate of the fuel cell is considerably low. However, according to the EMS 1, the fuel cell as the power generation system 25 described above can be used for power generation during demand response. As a result, the facility operation rate of the fuel cell can be improved.

The present disclosure is not necessarily limited to the above-described embodiments. Various modifications can be made without departing from the gist of the invention.

Modification 1

Figure 11:
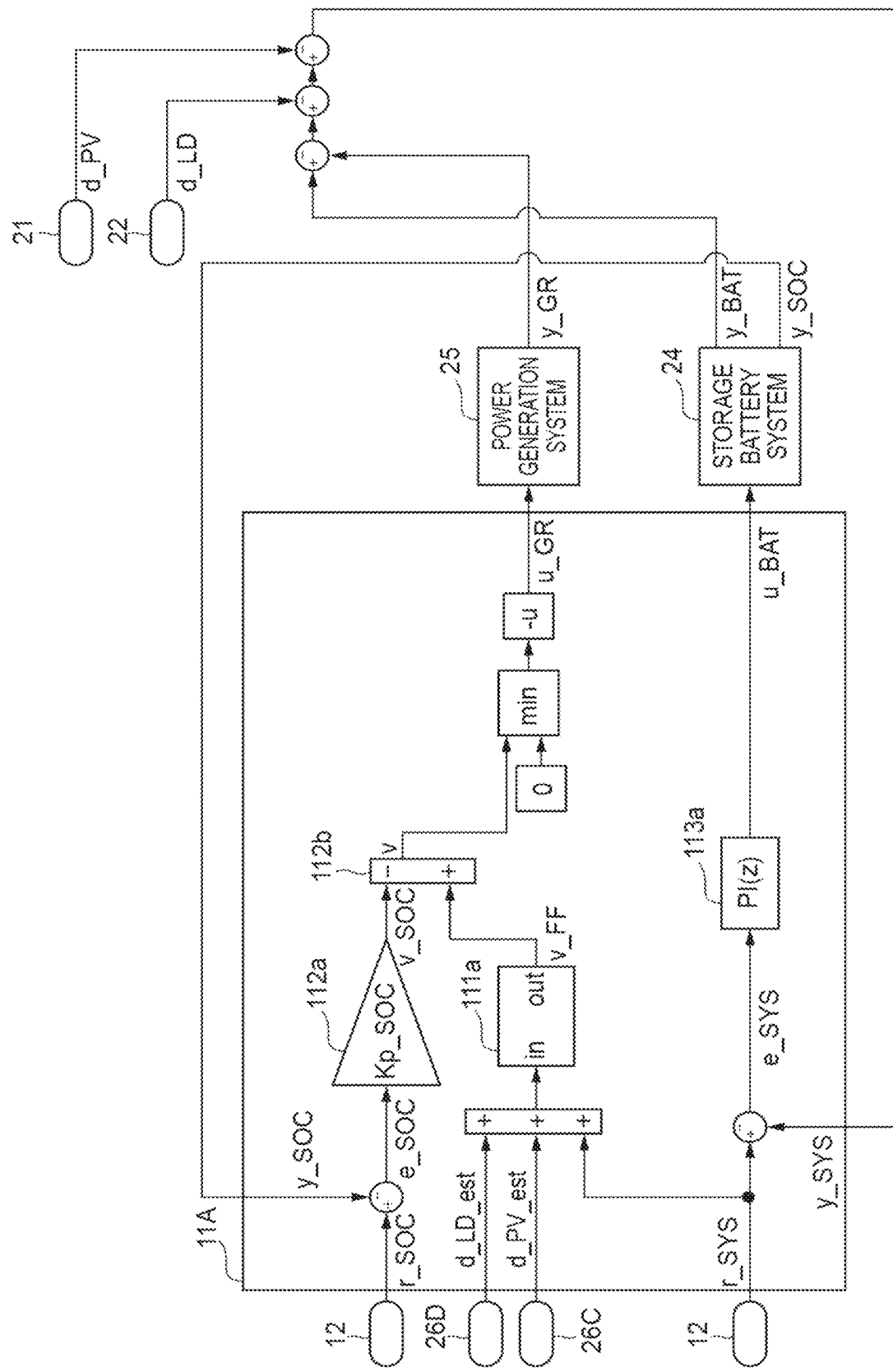
FIG. 11 is a functional block diagram of a command value generation unit included in the energy management system according to a modification.
Figure 12:
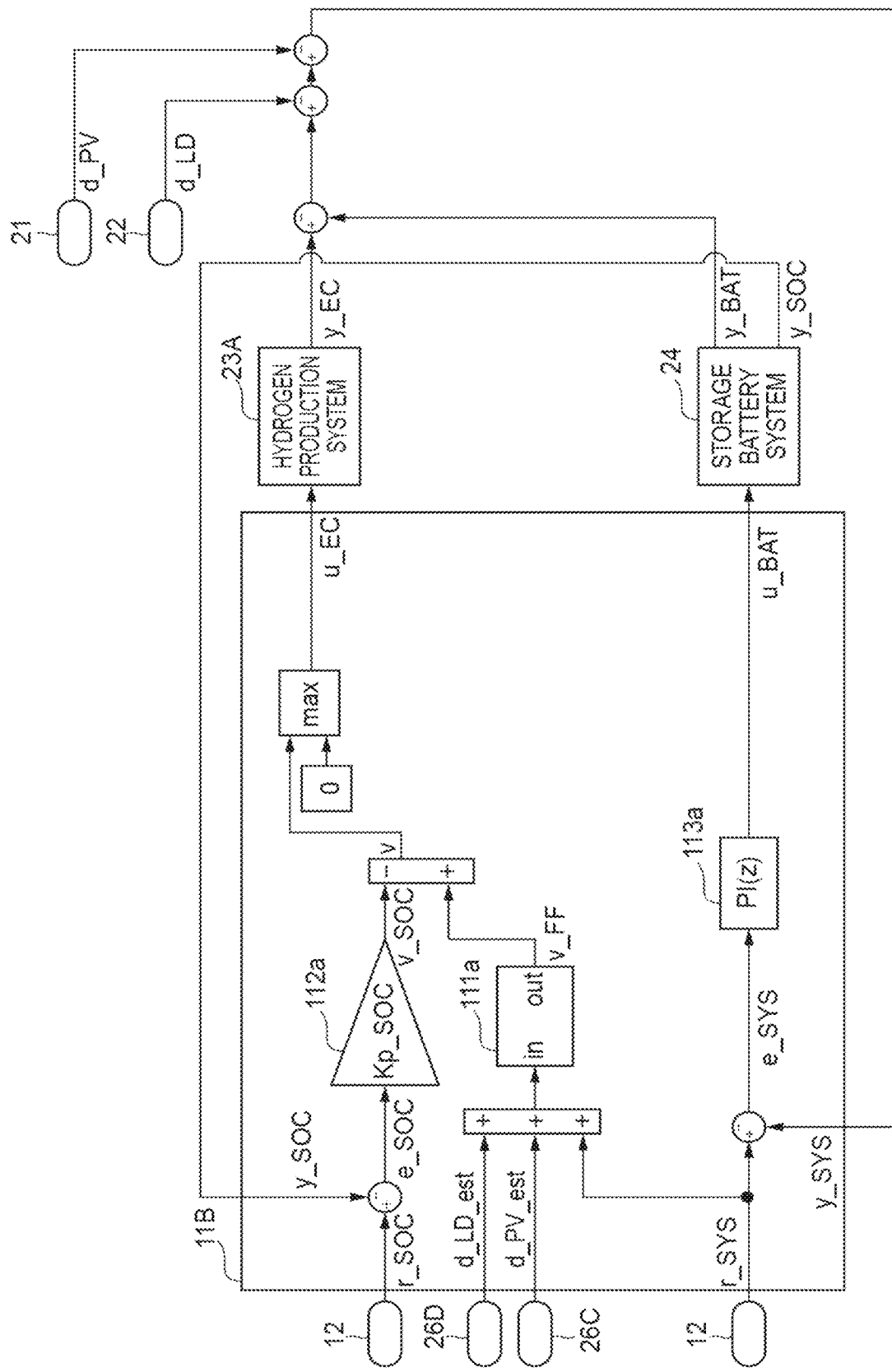
FIG. 12 is a functional block diagram of a command value generation unit included in an energy management system according to another modification.

As also illustrated in Example 1, the microgrid 2 may include either one or both of the power generation device that is the power generation system 25 and the power consumption device that is the hydrogen production system 23A. The power generation device such as the power generation system 25 and the power consumption device such as the hydrogen production system 23A are collectively referred to as a power generation/load adjustable device in the present specification. For example, FIG. 11 illustrates a control block of the command value generation unit 11A included in the EMS in a case where the power generation system 25 is included but the hydrogen production system 23A is not included. For example, FIG. 12 illustrates a control block of the command value generation unit 11B included in the EMS in a case where hydrogen production system 23A is included but the power generation system 25 is not included.

Modification 2

In the above description, the term of receiving/transmitting power is used, but this is not necessarily limited to power at a contract responsibility demarcation point of a facility such as the microgrid 2 or a building. The EMS 1 of the present disclosure controls generated power of a renewable energy power generation device, charge/discharge power in a storage battery system, and power on a power line upstream of a power generation/load adjustable device.

Modification 3

The EMS 1 may stop the feedback control for the storage battery system 24 on condition that the remaining capacity of power stored in the storage battery system 24 becomes less than or equal to a certain value. The EMS 1 may stop the feedback control for the storage battery system 24 on condition that the remaining capacity of power stored in the storage battery system 24 becomes equal to or more than a certain value.

Modification 4

The EMS 1 of the present disclosure generates the load command value (v) based on the feedforward control and the SOC constant control. The EMS 1 of the present disclosure distributes all the generated load command values (v) to the hydrogen production system 23A and/or the power generation system 25.

For example, when the load command value (v) becomes a small value near zero, the operation in which the hydrogen production system 23A produces a trace amount of hydrogen and the operation in which the power generation system 25 generates a trace amount of power are alternately repeated according to the sign inversion. In general, it is not preferable that the start and stop of the device are frequently switched. Therefore, on condition that the magnitude of the load command value (v) is a certain value or less, the load command value (v) may be distributed to the charge/discharge command value (u_BAT) of the storage battery system 24 (u_BAT=v+u_BAT). As a result, the load command value (v) for the hydrogen production system 23A can be set to zero, and the load command value (v) for the power generation system 25 can be set to zero. Therefore, it is possible to prevent frequent switching between operation and stop of the hydrogen production system 23A and the power generation system 25. The distribution process to the storage battery system 24 may be performed only for the hydrogen production system 23A. The distribution process to the storage battery system 24 may be performed only when the absolute value of the load command value (v) is small and the load command value (v) is positive. The distribution process to the storage battery system 24 may be performed only for the power generation system 25. That is, the distribution process to the storage battery system 24 may be performed only when the absolute value of the load command value (v) is small and the load command value (v) is negative.

According to these configurations, it is possible to perform control in accordance with the operating conditions of the power generation system 25 and/or the hydrogen production system 23A.

In short, when the magnitude of the power generation/load power command value is small, the EMS 1 may allocate the power generation/load power command value to the charge/discharge power of the energy storage device instead of the power generation/load adjustable device.

Modification 5

In the simulations of Examples 1 and 2, the time constant of the first-order delay used for the smoothing filter 111a is fixed. The time constant of the first-order delay used for the smoothing filter 111a, may be variable. For example, when the generated power of the photovoltaic power generation system 21 greatly and rapidly fluctuates, there is a possibility that the charge/discharge power command value (u_BAT) of the storage battery system 24 temporarily becomes equal to or more than the rated value of the charge/discharge power. In such a case, there is a possibility that a large deviation occurs in the receiving/transmitting power with respect to the target value (r_SYS). Therefore, as the charge/discharge power command value (u_BAT) of the storage battery system 24 approaches the rated value of charge/discharge, the time constant of the smoothing filter 111a is decreased. As a result, the load change of the hydrogen production system 23A and/or the power generation system 25 is temporarily accelerated. Therefore, it is possible to reduce the deviation with respect to the target value (r_SYS) of the receiving/transmitting power.

Modification 6

In the above-described embodiment, the PID controller is exemplified as the feedback control unit 113 used in the storage battery system 24. The controller used as the feedback control unit 113 may be another controller such as a PI controller, a PD controller, an I-PD controller, or a 2-degree-of-freedom PID controller. The controller used as the feedback control unit 113 may be a controller using a control theory such as an $H_2$ control theory or an Ho control theory.

Modification 7

In Examples 1 and 2, the target value (r_SOC) of the remaining capacity of the storage battery system 24 is constant at 50%. The target value (r_SOC) of the remaining capacity of the storage battery system 24 may be variable. For example, the storage battery system 24 may be used to perform an energy shift such that charging occurs during the daytime but discharging occurs during the nighttime. In this case, the target value (r_SOC) of the remaining capacity of the storage battery system 24 may be a curve that gradually increases from sunshine to sunset and gradually decreases from sunset to sunshine.

The target value (r_SOC) of the remaining capacity of the storage battery system 24 may be set each time using the weather forecast for the next day. For example, when it is expected that the generated power of the photovoltaic power generation system 21 exceeds the total value of the power demand and the rated value of the water electrolysis device, the target value (r_SOC) may be set such that the remaining storage battery capacity gradually increases in the daytime. In other words, in a case where a power surplus is expected, the target value (r_SOC) may be set such that the remaining storage battery capacity gradually increases during the day. Further, the target value (r_SOC) of the remaining capacity of the storage battery system 24 may be set to 50% under the condition of cloudiness or the like. The operator may manually set the target value (r_SOC) of the remaining capacity of the storage battery system 24. The target value (r_SOC) of the remaining capacity of the storage battery system 24 may be given to the EMS 1 from another upper system determined by an optimization method or the like.

Modification 8

The number of hydrogen production systems 23A and the number of power generation systems 25 included in the power system to be controlled by the EMS 1 are not particularly limited. In the above-described embodiment, the microgrid 2 includes one hydrogen production system 23A and one power generation system 25. However, the number of hydrogen production systems 23A and the number of power generation systems 25 included in the microgrid 2 are not limited to one.

For example, when there are a plurality of hydrogen production systems 23A, the EMS 1 distributes the power consumption command value (u_EC) to the hydrogen production systems 23A of Examples 1 and 2 to each of the hydrogen production systems 23A according to the rated ratio. The EMS 1 may distribute the power consumption command value (u_EC) to the hydrogen production systems 23A of Examples 1 and 2 according to the facility operating time. The power consumption facility may be an ammonia production system instead of the hydrogen production system 23A. In this case, the hydrogen storage system is an ammonia storage system. The power generation system 25 may be a fuel cell using ammonia as a fuel. A power consumption facility that produces both hydrogen and ammonia may be located within the premises. The power generation system 25 may be a fuel cell using both hydrogen and ammonia as fuel.

Modification 9

The renewable energy power generation device is not limited to the one including only the photovoltaic power generation system 21. For example, the renewable energy power generation device may be a combined system including a photovoltaic power generation system 21 and a wind power generation system.

Modification 10

In the above-described embodiment, the power has been described as AC power. The receiving/transmitting power as the controlled variable may be a direct current. In the case of AC, a capacitor or the like for controlling a power factor may be used as the power facility.

Modification 11

A proportional gain element 112a is used to control the remaining capacity of the storage battery system 24. Instead of the proportional gain element 112a, a nonlinear gain element may be used. For example, when the absolute value of the difference between the SOC control gain (Kp_SOC) and the remaining storage battery capacity (SOC) target value (r_SOC) is small, the nonlinear gain element is set to a small gain. In this case, the gain may be zero. The nonlinear gain element may be set to a large gain when the deviation is large. In other words, the non-linear gain element may be set to a large gain when approaching the upper and lower limits of the storage battery capacity. In further other words, the non-linear gain element may be set to a large gain when approaching the upper and lower limits of the storage battery capacity. The control technique of the present disclosure does not aim to strictly control the remaining capacity of the storage battery system 24. Therefore, the control using such a nonlinear gain element is suitable as long as there is no problem in the remaining capacity of the storage battery system 24.

Modification 12

In Example 2, since the target value (r_SYS) is changed to power transmission for one and a half hours from 13:00, the power consumption of the hydrogen production system 23A is zero (see FIG. 9(b)). However, in some cases, some power consumption facilities cannot set the operable minimum power consumption to 0 kW. For example, the minimum operating condition of the power consumption facility may be, for example, up to 10% of the rating. Manual work is required for the operation of stopping the operation of the power consumption facility. When the power consumption facility is activated, it may take about several hours due to temperature rise or the like. That is, there may be some restrictions on the operation of the power consumption facilities.

Therefore, in a case where a demand response for a short time (one and a half hours) as in Example 2 is assumed, it may be more convenient to continue the minimum load operation than to set the power consumption of the power consumption device to 0 kW.

Figure 13:
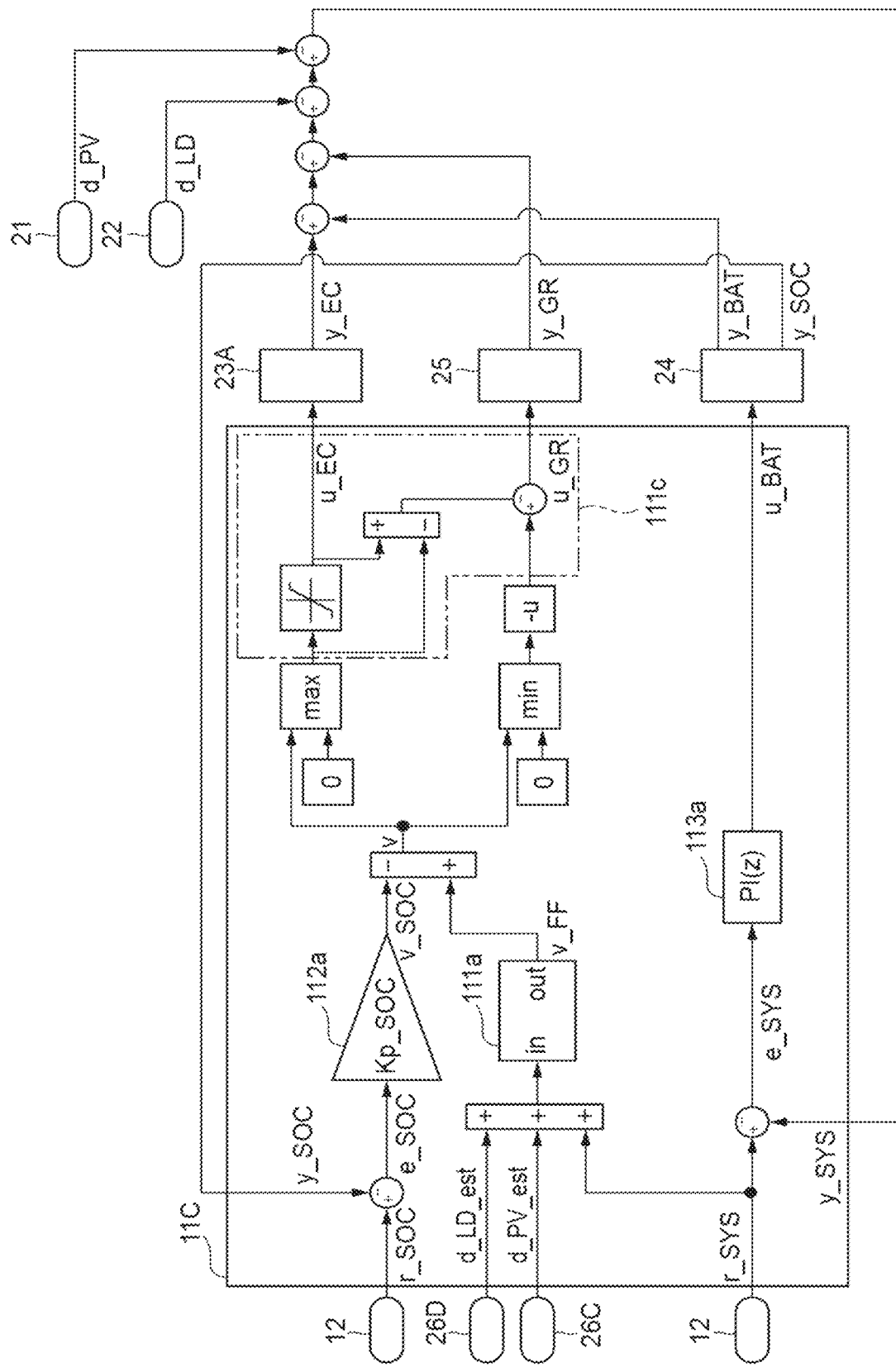
FIG. 13 is a functional block diagram of a command value generation unit included in an energy management system according to still another modification.

FIG. 13 is a control block diagram of a command value generation unit 11C included in the EMS according to Modification 12. The EMS 1 includes a saturator 111c. The lower limit of the saturator 111c is the minimum power consumption added to the preceding stage of the command value (u_BAT) of the hydrogen production system 23A. When the command value (u_BAT) is between the minimum target command value and the maximum target command value, the saturator 111c outputs the input command value (u_BAT) as it is. When the command value (u_BAT) is less than or equal to the minimum target command value, the saturator 111c outputs the minimum target command value as a new command value (u_BAT) instead of the input command value (u_BAT). When the command value (u_BAT) is equal to or more than the maximum target command value, the saturator 111c outputs the maximum target command value as a new command value (u_BAT) instead of the input command value (u_BAT). The EMS 1 adds the difference between before and after the saturator 111c to the command value (u_GR) of the power generation system 25. For example, the EMS 1 adds, to the command value (u_GR) of the power generation system 25, a difference between the command value (u_BAT) input to the saturator 111c and the minimum target command value set as the new command value (u_BAT). As a result, the lower limit of the power consumption of the hydrogen production system 23A is suppressed to a certain value. The power consumption is compensated for by the power generation system 25. The difference between before and after the saturator 111c may be a block not to be added to the power generation system 25. A configuration only for adding the saturator 111c may be adopted. In this case, the minimum power consumption is compensated for by the discharge of the storage battery system 24. When the minimum power consumption×the duration time is sufficiently smaller than the capacity of the storage battery, the latter method can be adopted.

The target presentation unit 12 included in the EMS 1 further indicates the minimum target command value that is a minimum value of the first command value and/or the maximum target command value that is a maximum value of the first command value. The command value generation unit 11C outputs the minimum target command value as the first command value when the first command value is less than or equal to the minimum target command value. The command value generation unit 11C outputs the maximum target command value as the first command value when the first command value is equal to or greater than the maximum target command value. According to this configuration, it is possible to perform control in accordance with the operating conditions of the power generation system 25 and the hydrogen production system 23A.

The command value generation unit 11C included in the EMS 1 outputs the minimum target command value or the maximum target command value to the hydrogen production system 23A. The command value generation unit 11C outputs, to the power generation system 25, a complement command value for complementing power corresponding to a difference between the first command value and the minimum target command value or power corresponding to a difference between the first command value and the maximum target command value. According to this configuration, it is possible to satisfactorily perform control in accordance with the operating conditions of the power generation system 25 and the hydrogen production system 23A.

The command value generation unit 11C included in the EMS 1 outputs the minimum target command value or the maximum target command value to the hydrogen production system 23A. The command value generation unit 11C outputs, to the storage battery system 24, a complement command value for complementing power corresponding to a difference between the first command value and the minimum target command value or power corresponding to a difference between the first command value and the maximum target command value. Also with this configuration, it is possible to satisfactorily perform control in accordance with the operating conditions of the power generation device and/or the demand device.

Supplementary Note

Hydrogen is attracting attention as a next-generation energy source. The power system adjusting device and the power system adjusting program of the present disclosure can perform hydrogen production using surplus power of renewable energy. Therefore, the power system adjusting device and the power system adjusting program of the present disclosure contribute to the spread of $CO_2$-free hydrogen. The power system adjusting device and the power system adjusting program of the present disclosure illustrate a technique for suppressing an adverse effect on the power system, which is an issue of the renewable energy power supply, and contribute to the spread and expansion of the renewable energy power supply itself. That is, the power system adjusting device and the power system adjusting program of the present disclosure contribute to the target 7.2 and the target 9.3 listed in the sustainable development target (SDGs) led by the United Nations.

The target 7.2 is "to increase substantially the share of renewable energy in the global energy mix by 2030".

The target 9.3 is "by 2030 to upgrade infrastructure and retrofit industries to make them sustainable, with increased resource use efficiency and greater adoption of clean and environmentally sound technologies and industrial processes, all countries taking action in accordance with their respective capabilities".

Supplementary Note

The present disclosure includes the following configurations.

A power system adjusting device according to the present disclosure is [1] "A power system adjusting device including: a renewable energy power generation device configured to generate power using renewable energy; a power generation device having a first responsiveness and being capable of adjusting power to be output and/or a demand device capable of adjusting power to be consumed; an energy storage device configured to have a second responsiveness equivalent to the first responsiveness or equal to or greater than the first responsiveness, store received power, and output stored power; and a power consumer including equipment that consumes power output from the renewable energy power generation device, power output from the power generation device, and power output from the energy storage device, the power system adjusting device including: a target presentation unit configured to indicate target power; a power acquisition unit configured to obtain combined power obtained by adding power output from the renewable energy power generation device and power output from the power generation device and/or power consumed by the demand device, power output or consumed by the energy storage device, and power consumed by the power consumer; and a command value generation unit configured to generate a first command value and a second command value such that the combined power asymptotically approaches the target power, in which the combined power includes a long- and intermediate-period component including a first variation component and a short-period component including a second variation component belonging to a frequency band higher than the first variation component, and the command value generation unit is configured to: output the first command value corresponding to the long- and intermediate-period component to the power generation device and/or the demand device; and output the second command value corresponding to the short-period component to the energy storage device."

The power system adjusting device according to the present disclosure is [2] "The power system adjusting device according to [1] described above, in which the power acquisition unit further acquires power output from the renewable energy power generation device and power consumed by the power consumer, and the command value generation unit generates the first command value corresponding to the long- and intermediate-period component by using power output from the renewable energy power generation device, power consumed by the power consumer, and the target power, and generates the second command value corresponding to the short-period component by using the combined power and the target power."

The power system adjusting device according to the present disclosure is [3] "The power system adjusting device according to [1] or [2] described above, in which the power acquisition unit further acquires power stored in the energy storage device, the target presentation unit further indicates a target stored energy value which is a target value of power stored in the energy storage device, and the command value generation unit generates the second command value such that a remaining amount of power stored in the energy storage device asymptotically approaches the target stored energy value."

The power system adjusting device according to the present disclosure is [4] "The power system adjusting device according to any one of [1] to [3] described above, in which the target presentation unit further indicates a minimum target command value that is a minimum value of the first command value and/or a maximum target command value that is a maximum value of the first command value, and the command value generation unit outputs a minimum target command value as the first command value when the first command value is less than or equal to a minimum target command value, and outputs a maximum target command value as the first command value when the first command value is greater than or equal to a maximum target command value."

The power system adjusting device according to the present disclosure is [5] "The power system adjusting device according to [4] described above, in which the command value generation unit outputs the minimum target command value or the maximum target command value to the demand device, and outputs a complement command value for complementing power corresponding to a difference between the first command value and the minimum target command value or power corresponding to a difference between the first command value and the maximum target command value to the power generation device."

The power system adjusting device according to the present disclosure is [6] "The power system adjusting device according to [4] described above, in which the command value generation unit outputs the minimum target command value or the maximum target command value to the demand device, and outputs a complement command value for complementing power corresponding to a difference between the first command value and the minimum target command value or power corresponding to a difference between the first command value and the maximum target command value to the energy storage device."

A power system adjusting program according to the present disclosure is [7] "A power system adjusting program causing a computer to execute adjusting a power system including: a renewable energy power generation device configured to generate power using renewable energy; a power generation device having a first responsiveness and being capable of adjusting power to be output and/or a demand device capable of adjusting power to be consumed; an energy storage device configured to have a second responsiveness equivalent to the first responsiveness or equal to or greater than the first responsiveness, store received power, and output stored power; and a power consumer including equipment that consumes power output from the renewable energy power generation device, power output from the power generation device, and power output from the energy storage device, the power system adjusting program causing the computer to execute: indicating target power; obtaining combined power obtained by adding power output from the renewable energy power generation device, power output from the power generation device and/or power consumed by the demand device and power output or consumed by the energy storage device, and power consumed by the power consumer; and generating a first command value and a second command value such that the combined power asymptotically approaches the target power, in which the combined power includes a long- and intermediate-period component including a first variation component and a short-period component including a second variation component belonging to a frequency band higher than the first variation component, and in generating the first command value and the second command value, outputting the first command value corresponding to the long- and intermediate-period component to the power generation device and/or the demand device, and outputting the second command value corresponding to the short-period component to the energy storage device."

A power system adjusting device according to the present disclosure is [8] "A power system adjusting device including: a renewable energy power generation device configured to generate power using renewable energy; a power generation device having a first responsiveness and being capable of adjusting power to be output and/or a demand device capable of adjusting power to be consumed; an energy storage device configured to have a second responsiveness equivalent to the first responsiveness or equal to or greater than the first responsiveness, store received power, and output stored power; and a power consumer including equipment that consumes power output from the renewable energy power generation device, power output from the power generation device, and power output from the energy storage device, the power system adjusting device including: a target presentation unit configured to indicate target power; a power acquisition unit configured to acquire power output from the renewable energy power generation device and power consumed by the power consumer; and the command value generation unit configured to generate a first command value and a second command value such that combined power obtained by adding power output from the renewable energy power generation device and power output from the power generation device and/or power consumed by the demand device, power output or consumed by the energy storage device, and power consumed by the power consumer asymptotically approaches the target power, in which the combined power includes a long- and intermediate-period component including a first variation component and a short-period component including a second variation component belonging to a frequency band higher than the first variation component, and the command value generation unit generates the first command value corresponding to the long- and intermediate-period component by using power output from the renewable energy power generation device, power consumed by the power consumer, and the target power, and generates the second command value corresponding to the short-period component by using the combined power and the target power."

REFERENCE SIGNS LIST

1 EMS (power system adjusting device)
2 Microgrid
3 Power system
4 Resource aggregator
11, 11C Command value generation unit
12 Target presentation unit
13 Power acquisition unit
21 Photovoltaic power generation system
22 Power consumer
23A Hydrogen production system
23B Hydrogen storage system
24 Storage battery system
25 Power generation system
26 Power measurement unit
26A Transmitted power measurement unit
26B Received power measurement unit
26C Renewable energy power measurement unit
26D Consumer's power consumption measurement unit
27 Connection unit
101 CPU
102 Main storage unit
103 Auxiliary storage unit
104 Communication control unit
105 Input device
106 Output device
110 Program
111 Feedforward control unit
111a Smoothing filter
111b Distribution element
111c Saturator
112 Command value correction unit
112a Proportional gain element
112b Correction element
113 Feedback control unit
121 Operation unit
122 External communication unit
211 Solar panel
212 Power conditioner

The invention claimed is:

1. A power system adjusting device including: a renewable energy power generation device configured to generate power using renewable energy; a power generation device having a first responsiveness and being capable of adjusting power to be output and/or a demand device capable of adjusting power to be consumed; an energy storage device configured to have a second responsiveness equivalent to the first responsiveness or equal to or greater than the first responsiveness, store received power, and output stored power; and a power consumer including equipment that consumes power output from the renewable energy power generation device, power output from the power generation device, and power output from the energy storage device, the power system adjusting device comprising:
- a target presentation unit configured to indicate target power;
- a power acquisition unit configured to obtain combined power obtained by adding power output from the renewable energy power generation device and power output from the power generation device and/or power consumed by the demand device, power output or consumed by the energy storage device, and power consumed by the power consumer; and
- a command value generation unit configured to generate a first command value and a second command value such that the combined power asymptotically approaches the target power, wherein
- the combined power includes a long- and intermediate-period component including a first variation component and a short-period component including a second variation component belonging to a frequency band higher than the first variation component, and
- the command value generation unit is configured to:
- output the first command value corresponding to the long- and intermediate-period component to the power generation device and/or the demand device; and
- output the second command value corresponding to the short-period component to the energy storage device.

2. The power system adjusting device according to claim 1, wherein
- the power acquisition unit further acquires power output from the renewable energy power generation device and power consumed by the power consumer, and
- the command value generation unit
- generates the first command value corresponding to the long- and intermediate-period component by using power output from the renewable energy power generation device, power consumed by the power consumer, and the target power, and
- generates the second command value corresponding to the short-period component by using the combined power and the target power.

3. The power system adjusting device according to claim 1, wherein
- the power acquisition unit further acquires power stored in the energy storage device,
- the target presentation unit further indicates a target stored energy value which is a target value of power stored in the energy storage device, and
- the command value generation unit generates the second command value such that a remaining amount of power stored in the energy storage device asymptotically approaches the target stored energy value.

4. The power system adjusting device according to claim 1, wherein
- the target presentation unit further indicates a minimum target command value that is a minimum value of the first command value and/or a maximum target command value that is a maximum value of the first command value, and
- the command value generation unit outputs a minimum target command value as the first command value when the first command value is less than or equal to a minimum target command value, and outputs a maximum target command value as the first command value when the first command value is greater than or equal to a maximum target command value.

5. The power system adjusting device according to claim 4, wherein
- the command value generation unit
- outputs the minimum target command value or the maximum target command value to the demand device, and
- outputs a complement command value for complementing power corresponding to a difference between the first command value and the minimum target command value or power corresponding to a difference between the first command value and the maximum target command value to the power generation device.

6. The power system adjusting device according to claim 4, wherein
- the command value generation unit
- outputs the minimum target command value or the maximum target command value to the demand device, and
- outputs a complement command value for complementing power corresponding to a difference between the first command value and the minimum target command value or power corresponding to a difference between the first command value and the maximum target command value to the energy storage device.

7. A power system adjusting program causing a computer to execute adjusting a power system including: a renewable energy power generation device configured to generate power using renewable energy; a power generation device having a first responsiveness and being capable of adjusting power to be output and/or a demand device capable of adjusting power to be consumed; an energy storage device configured to have a second responsiveness equivalent to the first responsiveness or equal to or greater than the first responsiveness, store received power, and output stored power; and a power consumer including equipment that consumes power output from the renewable energy power generation device, power output from the power generation device, and power output from the energy storage device, the power system adjusting program causing the computer to execute:
- indicating target power;
- obtaining combined power obtained by adding power output from the renewable energy power generation device, power output from the power generation device and/or power consumed by the demand device and power output or consumed by the energy storage device, and power consumed by the power consumer; and
- generating a first command value and a second command value such that the combined power asymptotically approaches the target power, wherein
- the combined power includes a long- and intermediate-period component including a first variation component and a short-period component including a second variation component belonging to a frequency band higher than the first variation component, and
- in generating the first command value and the second command value,
- outputting the first command value corresponding to the long- and intermediate-period component to the power generation device and/or the demand device, and
- outputting the second command value corresponding to the short-period component to the energy storage device.

8. A power system adjusting device including: a renewable energy power generation device configured to generate power using renewable energy; a power generation device having a first responsiveness and being capable of adjusting power to be output and/or a demand device capable of adjusting power to be consumed; an energy storage device configured to have a second responsiveness equivalent to the first responsiveness or equal to or greater than the first responsiveness, store received power, and output stored power; and a power consumer including equipment that consumes power output from the renewable energy power generation device, power output from the power generation device, and power output from the energy storage device, the power system adjusting device comprising:

a target presentation unit configured to indicate target power;

a power acquisition unit configured to acquire power output from the renewable energy power generation device and power consumed by the power consumer; and the command value generation unit configured to generate a first command value and a second command value such that combined power obtained by adding power output from the renewable energy power generation device and power output from the power generation device and/or power consumed by the demand device, power output or consumed by the energy storage device, and power consumed by the power consumer asymptotically approaches the target power, wherein the combined power includes a long- and intermediate-period component including a first variation component and a short-period component including a second variation component belonging to a frequency band higher than the first variation component, and the command value generation unit generates the first command value corresponding to the long- and intermediate-period component by using power output from the renewable energy power generation device, power consumed by the power consumer, and the target power, and generates the second command value corresponding to the short-period component by using the combined power and the target power.

\* \* \* \* \*